United States Patent
Mirrashidi et al.

(10) Patent No.: US 9,569,806 B2
(45) Date of Patent: Feb. 14, 2017

(54) DYNAMIC PRESENTATION OF LOCATION-SPECIFIC INFORMATION

(75) Inventors: Payam Mirrashidi, San Francisco, CA (US); Tyler A. Strand, Palo Alto, CA (US); Mark Miller, San Francisco, CA (US); Ellis M. Verosub, San Carlos, CA (US); Yoon Sub Hwang, Alameda, CA (US)

(73) Assignee: APPLE INC., Cupertino, CA (US)

( * ) Notice: Subject to any disclaimer, the term of this patent is extended or adjusted under 35 U.S.C. 154(b) by 2353 days.

(21) Appl. No.: 11/849,865

(22) Filed: Sep. 4, 2007

(65) Prior Publication Data

US 2009/0063293 A1 Mar. 5, 2009

(51) Int. Cl.
*G06Q 30/00* (2012.01)
*G06Q 50/12* (2012.01)
*G06Q 30/06* (2012.01)
*G06Q 30/02* (2012.01)

(52) U.S. Cl.
CPC .......... *G06Q 50/12* (2013.01); *G06Q 30/0619* (2013.01); *G06Q 30/0621* (2013.01); *G06Q 30/0633* (2013.01); *G06Q 30/0641* (2013.01); *G06Q 30/02* (2013.01)

(58) Field of Classification Search
USPC ................... 705/26.1–27.2, 51–59, 14.65,705/14.49–14.5, 14.57–14.58, 14.62–14.64,705/15–17
See application file for complete search history.

(56) References Cited

U.S. PATENT DOCUMENTS 5,379,057 A  1/1995  Clough et al.
5,675,362 A  10/1997  Clough et al.
6,091,956 A  7/2000  Hollenberg
6,356,761 B1  3/2002  Huttunen et al.
6,496,857 B1  12/2002  Dustin et al.
6,836,667 B1  12/2004  Smith
7,647,166 B1  1/2010  Kerns
2001/0030660 A1  10/2001  Zainoulline (Continued)

FOREIGN PATENT DOCUMENTS

EP    1 168 879 A    1/2002
JP    2003-308370    10/2003

(Continued)

OTHER PUBLICATIONS

"Starbucks Unveils In-Store Music Download Service". Dufor, Matt. The Tripwire. Mar. 15, 2004.*

(Continued)

*Primary Examiner* — William Allen
(74) *Attorney, Agent, or Firm* — Page Ponsford; Chia-Hsin Chu; DLA Piper LLP US

(57) ABSTRACT

Improved approaches to allow a portable electronic device to dynamically present location-specific information while the portable electronic device is at a predetermined location are disclosed. In one embodiment, the portable electronic device has a display that can display the location-specific information and has wireless capabilities for use in receiving the location-specific information from the server. The location-specific information can, for example, augment other information that is to be presented on the display. In one embodiment, the location-specific information can be information pertaining to a media item being played in an establishment, such as a store, where the portable electronic device is located.

14 Claims, 33 Drawing Sheets

(56) References Cited

U.S. PATENT DOCUMENTS

| | | | |
|---|---|---|---|
| 2002/0077897 A1 | 6/2002 | Zellner et al. | |
| 2002/0085025 A1 | 7/2002 | Busis et al. | |
| 2002/0102993 A1 | 8/2002 | Hendrey et al. | |
| 2002/0123373 A1 | 9/2002 | Kirbas et al. | |
| 2002/0152179 A1 | 10/2002 | Racov | |
| 2003/0110094 A1* | 6/2003 | Gulliver et al. | 705/26 |
| 2003/0233282 A1* | 12/2003 | Ward et al. | 705/26 |
| 2004/0044566 A1 | 3/2004 | Bostelmann et al. | |
| 2004/0169683 A1 | 9/2004 | Chiu et al. | |
| 2005/0091118 A1* | 4/2005 | Fano | 705/26 |
| 2005/0221841 A1 | 10/2005 | Piccionelli et al. | |
| 2006/0031126 A1* | 2/2006 | Ma et al. | 705/26 |
| 2007/0214182 A1* | 9/2007 | Rosenberg | 707/104.1 |
| 2007/0299737 A1* | 12/2007 | Plastina et al. | 705/26 |
| 2008/0032719 A1* | 2/2008 | Rosenberg | 455/466 |
| 2009/0043667 A1* | 2/2009 | DeYoe et al. | 705/26 |
| 2009/0089117 A1 | 4/2009 | Carlier et al. | |
| 2010/0063931 A1* | 3/2010 | Cole et al. | 705/51 |
| 2010/0161400 A1 | 6/2010 | Snodgrass et al. | |
| 2011/0066943 A1* | 3/2011 | Brillon et al. | 715/716 |

FOREIGN PATENT DOCUMENTS

| | | |
|---|---|---|
| JP | 2004-062812 | 2/2004 |
| JP | 2006-107149 | 4/2006 |
| JP | 2007-509388 | 4/2007 |
| KR | 2006-94394 | 8/2006 |
| WO | WO 2005/032105 | 2/2005 |

OTHER PUBLICATIONS

Final Office Action for U.S. Appl. No. 11/849,882 dated Mar. 18, 2011.
International Search Report and Written Opinion dated Dec. 4, 2008, from International Application No. PCT/US08/074955.
European Search Report for EP 08163668.0, mailed Dec. 4, 2008.
Tam et al., "Digits", Wall Street Journal, (Eastern edition), Aug. 10, 2000, 3 pgs.
Examiner's Second Report for Australian Patent Application No. 2008296408, dated Nov. 16, 2011.
Office Action for European Patent Application No. 08163668.0, mailed Mar. 18, 2011.
Notice of Preliminary Rejection for Korean Patent Application No. 10-2010-7007342, dated Aug. 26, 2011.
Notice of Final Rejection for Korean Patent Application 10-2010-7007342, dated Mar. 30, 2012.
Notification of First Office Action for Chinese Patent Application No. 20088011702.X, dated Nov. 4, 2011.
Office Action for European Patent Application EP 08163668.0, mailed Jan. 27, 2009.
International Preliminary Report on Patentability for PCT/US2008/074955 mailed Mar. 18, 2010.
Office Action for Japanese Patent Application No. 2010-524106, mailed Apr. 2, 2012.
Examiner's First Report for Australian Patent Application No. 2008296408, dated Oct. 27, 2010.
Office Action for U.S. Appl. No. 11/849,882 dated Aug. 31, 2010.

* cited by examiner

DYNAMIC PRESENTATION OF LOCATION-SPECIFIC INFORMATION

CROSS-REFERENCE TO OTHER APPLICATION

This application hereby references U.S. patent application Ser. No. 11/849,882, filed Sep. 4, 2007, entitled "GRAPHICAL USER INTERFACE WITH LOCATION-SPECIFIC INTERFACE ELEMENTS", which is herein incorporated by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever.

BACKGROUND OF THE INVENTION

Field of the Invention

The present invention relates to providing location-specific data and, more particularly, to providing location-specific data to patrons of a store.

Description of the Related Art

Businesses normally couple to the Internet by way of a leased line, such as a T1 line. Patrons (e.g., customers) to these businesses can also be permitted to access the Internet over the leased line by way of a router at the business location. In some cases, the router is a wireless router such that the patrons can gain access to the leased line by way of local wireless connections (e.g., WiFi). Some businesses, or independent network service providers that provide network access services at the businesses, charge patrons for Internet access, while other businesses offer network access free of charge. Regardless, once Internet access is provided, patrons are typically free to navigate the network.

Businesses can also play music, movies or music videos at their establishments for the benefit of employees and patrons. When a patron hears a song being played at the store, the patron could (while still at the establishment) attempt to remember the name of the song and then navigate to a portion of an online media store, e.g., iTunes™ media store, that offers the media content of the song for purchase. The navigation, however, can be cumbersome particularly when the patron does not know the exact name of the song. There can also be various versions (e.g., remixes, live version, acoustic version, clean version, explicit version) of some songs which can further complicate the navigation. These complications in navigation can frustrate a patron and cause them to fail to locate the desired song in the online media store. Electronic commerce (e-commerce) activity with respect to such songs, such as purchasing digital versions for download, can be frustrated given that locating of a particular song being played in an establishment on an online media store can be cumbersome.

Therefore, there is a need for improved approaches to assist patrons of businesses playing media items with the purchase or review of media items at an online media store.

SUMMARY OF THE INVENTION

The invention pertains to improved approaches to allow a portable electronic device to dynamically present location-specific information while the portable electronic device is at a predetermined location. In one embodiment, the portable electronic device has a display that can display the location-specific information and has wireless capabilities for use in receiving the location-specific information from the server. The location-specific information can, for example, augment other information that is to be presented on the display. In one embodiment, the location-specific information can be information pertaining to a media item being played in an establishment, such as a store, where the portable electronic device is located.

The invention can be implemented in numerous ways, including as a method, system, device, or apparatus (including computer readable medium or graphical user interface). Several embodiments of the invention are discussed below.

As a method for presenting customized data to a patron of an establishment, where the patron operates a portable electronic device at the establishment and has wireless network access, one embodiment of the invention includes at least: determining whether the portable electronic device associated with the patron is located at a predetermined establishment; and sending a data request from the portable electronic device associated with the patron located at the predetermined establishment to a remote data server. At least a portion of the data being requested by the data request is dependent on whether the patron is determined to be located at the predetermined establishment.

As a method for provide customized data to patrons of a store, one embodiment of the invention includes at least: receiving a data request initiated from a requesting electronic device associated with a patron located at a store; obtaining a store identifier for the store, the store identifier being provided with or associated to the data request; retrieving store-based information associated with the store based on the store identifier; forming a data response that includes at least the requested store-based information; and sending the data response to the requesting electronic device associated with the patron.

As a method for provide customized information to patrons of a store, another embodiment of the invention includes at least: receiving a data request initiated from a requesting electronic device associated with a patron located at a store; determining whether the patron is located at the store; and transmitting a data response to the requesting electronic device, wherein the data response includes or references store-based information pertaining to the store if it is determined that the patron is located at the store.

As a method for presenting a dynamic page on a network accessible electronic device associate with a user at a store location, the store location having a local wireless network that provides access to a global network, one embodiment of the invention includes at least: wirelessly connecting the device at the store location to the local wireless network; obtaining a store identifier for the store location; requesting, from the device, a page from an online media store using a page request, the page request including or referencing the store identifier; receiving the page request at an online media store server; determining whether the page request includes a store identifier; retrieving the request page and sending the requested page to the device when the page request does not include a store identifier; requesting store relevant information from a remote server based on the store identifier when the page request does include a store identifier; receiving the store relevant information; and retrieving the requested page, modifying the requested page in view of the store relevant information and sending the modified requested page to the device when the requested page does include a store identifier.

As a portable electronic device, one embodiment of the invention includes at least: a display; wireless communication circuitry; and a processor configured to determine whether the portable electronic device is located at an establishment, and to display information concerning the establishment on the display when the portable electronic device is located at the establishment.

As a computer readable medium including at least executable computer program code tangibly stored thereon for provide dynamic data to patrons of an establishment, one embodiment of the invention includes at least: computer program code for receiving a data request initiated from a requesting electronic device associated with a patron located at an establishment; computer program code for obtaining an identifier for the establishment, the identifier being provided with or associated to the data request; computer program code for retrieving establishment-based information associated with the establishment based on the identifier; computer program code for forming a data response that includes at least the requested establishment-based information; and computer program code for sending the data response to the requesting electronic device associated with the patron.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches to allow a portable electronic device to dynamically present location-specific information while the portable electronic device is at a predetermined location. In one embodiment, the portable electronic device has a display that can display the location-specific information and has wireless capabilities for use in receiving the location-specific information from the server. The location-specific information can, for example, augment other information that is to be presented on the display. In one embodiment, the location-specific information can be information pertaining to a media item being played in an establishment, such as a store, where the portable electronic device is located.

Embodiments of the invention are discussed below with reference to FIGS. 1-28. However, those skilled in the art will readily appreciate that the detailed description given herein with respect to these figures is for explanatory purposes as the invention extends beyond these limited embodiments.

Figure 1:
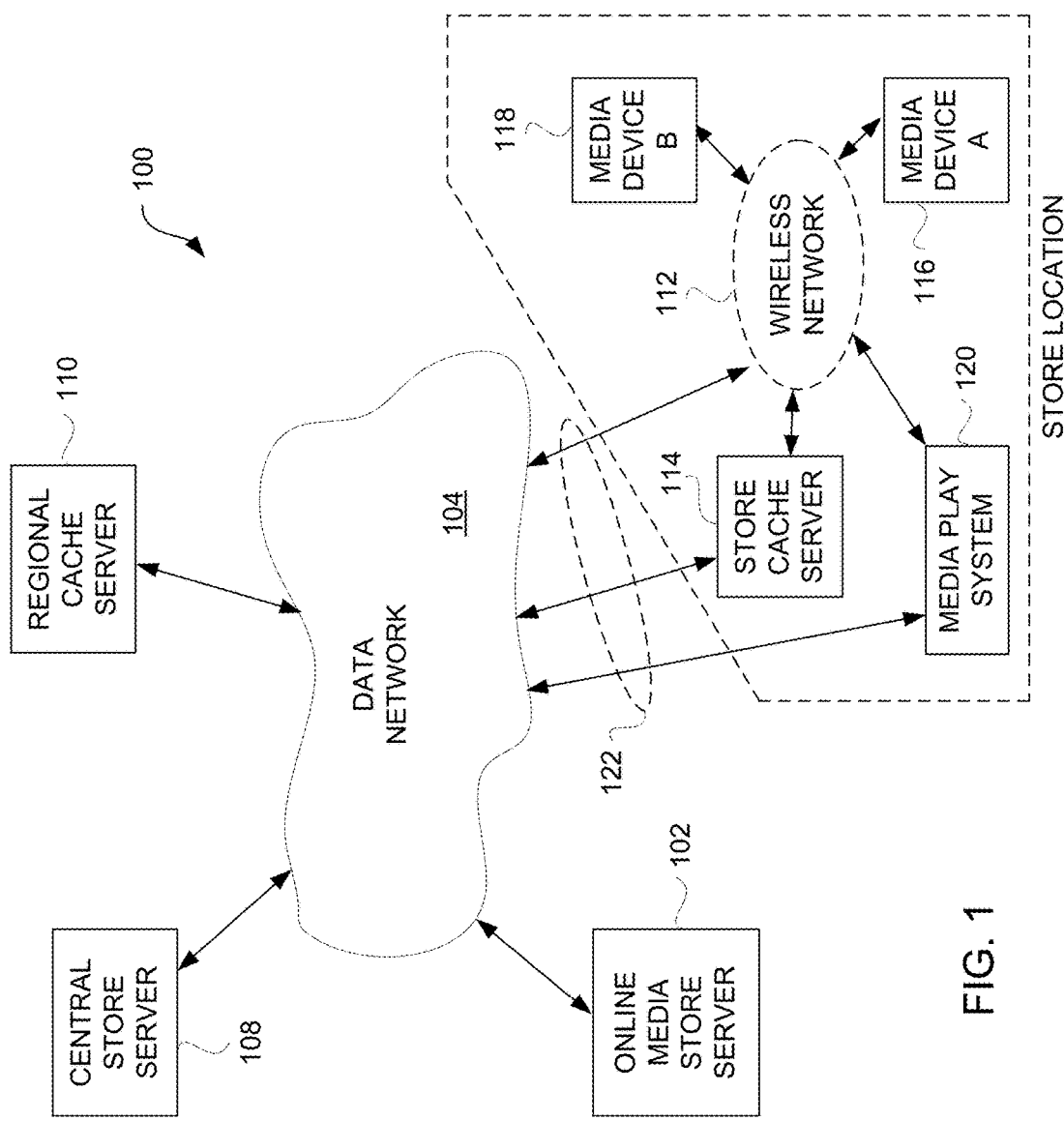
FIG. 1 is a block diagram of a media delivery system according to one embodiment of the invention.

FIG. 1 is a block diagram of a media delivery system 100 according to one embodiment of the invention. The media delivery system 100 includes an online media store server 102 that couples to a data network 104. The online media store can offer digital media assets (e.g., media items) for purchase, rental, preview, etc. One example of an online media store is iTunes™ media store operated by Apple Inc. of Cupertino, Calif. The data network 104 can include one or more networks, which can be not only public or private but also wired or wireless. The media delivery system 100 also includes equipment at a store location 106, a central store server 108 and a regional cache server 110, each of which can also couple to the data network 104. Although the media delivery system 100 illustrates only a single store location, namely, the store location 106, it should be understood that the media delivery system 100 typically supports a plurality of different store locations in different geographical locations.

The online media store server 102 hosts an online media store from which digital media assets can be acquired (e.g., purchased). On acquisition of a digital media asset, media content for the purchased digital media asset can be delivered to the purchaser. More particularly, the media content can be delivered to an electronic device (media device) associated with the user. In one scenario, the purchaser has interacted with the online media store server 102 from the store location 106 using an electronic device, such as a portable electronic device. In such case, the media content for the digital media asset can be delivered to the electronic device associated with the purchaser while residing at the store location 106.

The store location 106 includes a wireless network 112 and a store cache server 114. The wireless network 112 and/or the store cache server 114 can couple to the data network 104. Additionally, at the store location 106, one or more media devices 116 and 118 can be coupled to the wireless network 112. The wireless access network 110 can, for example, by a local area wireless network generally associated with the first store 104. One specific example of a local area wireless network is a WiFi network. Accordingly, patrons to the store location 106 that have a portable electronic device that supports wireless communication are able to communicate with the online media store server 102 by way of the data network 108 and the wireless access network 112. In doing so, the patron may purchase or otherwise acquire media content pertaining to a media item that is offered for acquisition (e.g., purchase, rental, etc.) by the online media store server 102.

Typically, the media devices 116 and 118 are portable electronic devices that are associated with persons (patrons) visiting the store location 106. When the media devices 116 and 118 are within the store location 106, the electronic devices, assuming that they support wireless communication, are able to access the wireless network 112 associated with the store location 106. As such, the media devices 116 and 118 are able to communicate to the online media store server 102 by way of the wireless network 112 and the data network 104. In the event that a user of one of the media devices 116 and 118 purchases is a digital media asset from the online media store server 102, the media content associated with the purchased digital media asset can be delivered to the media device 116 or 118 associated with the user.

In one embodiment, the central store server 108 operates in advance to store to the store cache server 114 at the store location 106 the likely required media content. Consequently, media content for a purchased digital media asset can be delivered locally at the store location 106 from the store cache server 114 to the requesting media device 116 or 118 via the wireless network 112. As such, the delivery of the media content is not required to be requested and returned from a remote server by way of the data network 104 or a network access link thereto which can suffer from network traffic or congestion. In one embodiment, the purchased digital media asset can be delivered directly from the store cache server 114. In another embodiment, the purchased digital media asset can be delivered from the online media store 102 or other remote server.

The store location 106 can also support a media play system 120. The media play system 120 can also be coupled to the data network 104. By being coupled to the data network 104, the central store server 108 can operate to manage the operation of the media play system 120 at the store location 106. In one embodiment, the media play system 120 operates to play media items at the store location 106. For example, the media play system 120 can cause songs and/or videos to be played at the store location 106 for the benefit of employees and patrons. The central store server 108 can centrally manage the media items that are to be played at the store location 106. In one embodiment, the media items being played by the media play system 120 are media items that are also offered for purchase by the online media store server 102.

The networking components in the store location 106 can couple to the data network 104 via a network access link 122. The network access link 122 is a shared network access resource, such as a lease line (e.g., T1 line) to the data network 104. The wireless network 112, the store cache server 114 and the media play system 120 can access the data network 104 via the network access link 122.

As an example of one usage scenario, a user at the store location 106 could hear a media item being played by the media play system 120 and elect to interact with the online media store server 102 to purchase the media item. As such, should a user of the media device 116 request to purchase such a media item from the online media store server 102 while at the store location 106, the media content for the purchased media item can be delivered to the media device 116.

In one embodiment, the media content for the media items that are to be delivered and stored in the store cache server 114 can be made available from the regional cache server 110. The regional cache server 110 is remotely located from the store location 106 but within a similar regional or metropolitan area as is the store location 106. Hence, the delivery of the media content to the store cache server 114 can efficiently utilize the regional cache server 110 to offload or distribute server loads for media content delivery. The regional cache server 110 can also be referred to as an edge server.

Although the media delivery system 100 is illustrated in FIG. 1 as having one store at the store location 106, it should be understood that the media delivery system 100 is suitable for use with one or more stores. Typically, a particular retailer will have a plurality of retail stores in different geographical locations. With all of the stores coupled to the data network 104, such as a global public network, the central store server 108 can manage the media being played in any of the plurality of retail stores. Consequently, these various retails stores can allow its patrons to wirelessly access a remote online media store while at a store location.

In one embodiment, the network or the networking infrastructure (e.g., WiFi wireless network) at the store facilitates access to the global network and can also inform another device (e.g., the electronic device and/or server) as to whether or not the electronic device is within the store. Various other ways can be used to determine whether an electronic device is within a store, such as using location technology (e.g., GPS, triangle navigation, or localized beacons).

Figure 2:
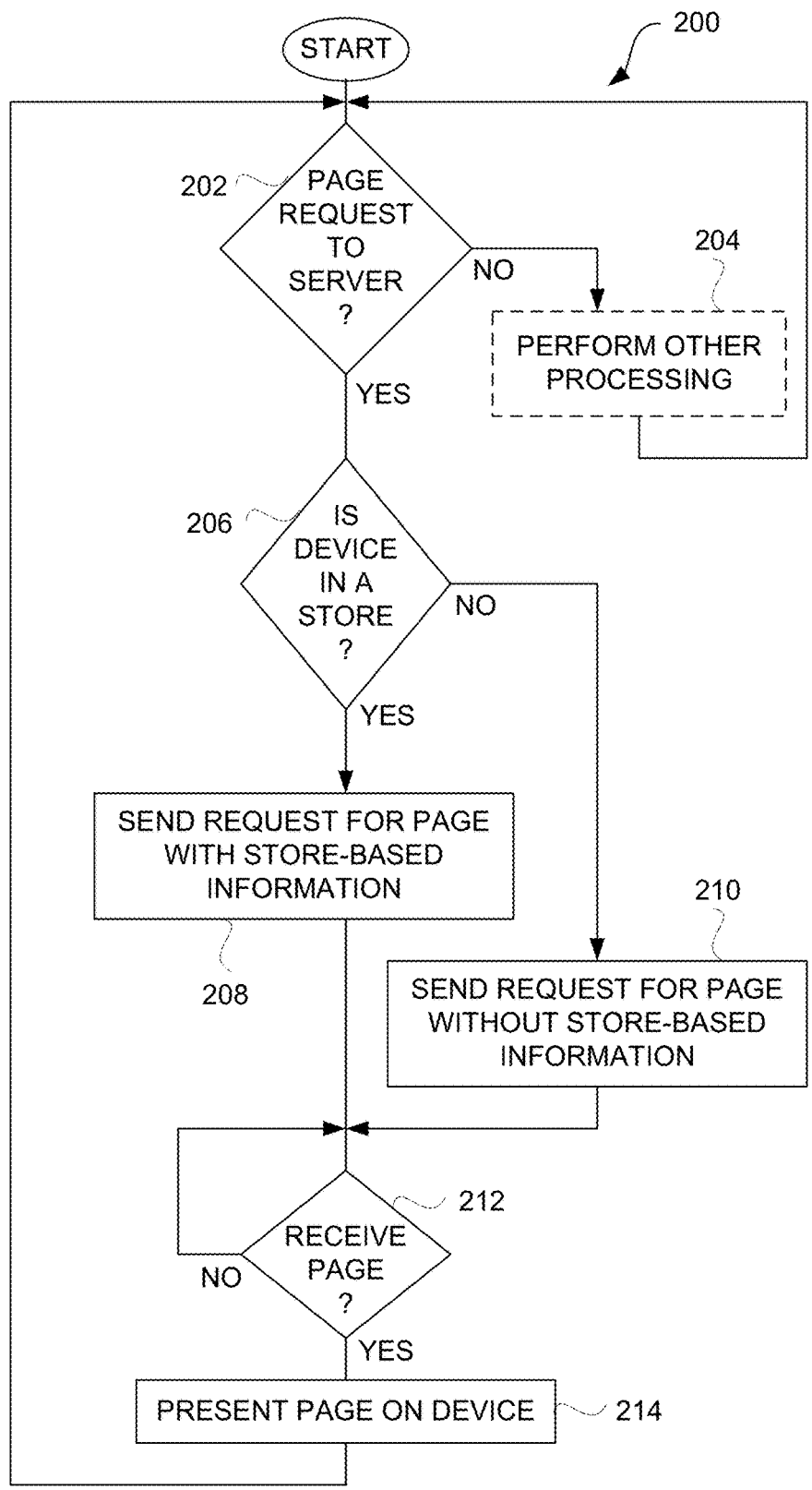
FIG. 2 is a flow diagram of a page request process according to one environment of the invention.

FIG. 2 is a flow diagram of a page request process 200 according to one environment of the invention. The page request process 200 is performed by a client device. The client device is an electronic device, namely, a portable electronic device. For example, the client device can be the media device A 116 or the media device B 116 illustrated in FIG. 1.

The page request process can begin with a decision 202. In the decision 202 can determine whether a page request is to be issued to a remote server. As an example, the remote server can pertain to the online media store server 102 illustrated in FIG. 1. When the decision 202 determines that a page request is not to be made to a remote server, other processing can be optionally performed 204. The other processing being performed 204 can be associated with various other features, applications or modules that are available on the client device. Following the block 204, the page request process 200 can return to repeat the decision 202.

When the decision 202 determines that a page request has been made to a remote server, a decision 206 can determine whether the client device is in a store. There are various different techniques that can be utilized to determine whether the client device is within a particular store. In one implementation, a local network available at the store can provide a store identifier to the client device when the client device accesses the local area network (e.g., wireless network 112), thereby signifying to the device that the client device is currently at the particular store identified by the store identifier. For example, the store cache server 114 can operate to attach a store identifier to a response header being sent to the client device.

When the decision 206 determines that the device is in a store, a request for a page with stored-based information can be sent 208. The request is sent 208 over one or more networks to the remote server. On the other hand, when the decision 206 determines that the client device is not in a store, a request for a page without store-based information can be sent 210. The request can be sent 210 over one or more networks to the remote server. Following the blocks 208 and 210, a decision 212 determines whether the requested page has been received. Here, in the page request process 200 is waiting to receive the requested page from the remote server. However, with reference to FIG. 1, it should be recognized that the requested page can be returned from not only the online media store server 102 but also a cache server, such as the store cache server 114 or the regional cache server 110. When the decision 212 determines that the requested page has been received, the requested page can be presented 214 on the client device. Typically, the client device includes a display and the requested page can be displayed on the display. The requested page can thus provide a graphical user interface (e.g., display screen).

Depending on whether or not the client device is within a store, the requested page being displayed may or may not display store-based information. Also, the store-based information when provided is typically only a portion of the requested page. Following the block 214, the page request process 200 can return to repeat the decision 202 and subsequent operations so that additional page requests can be similarly processed.

Figure 3:
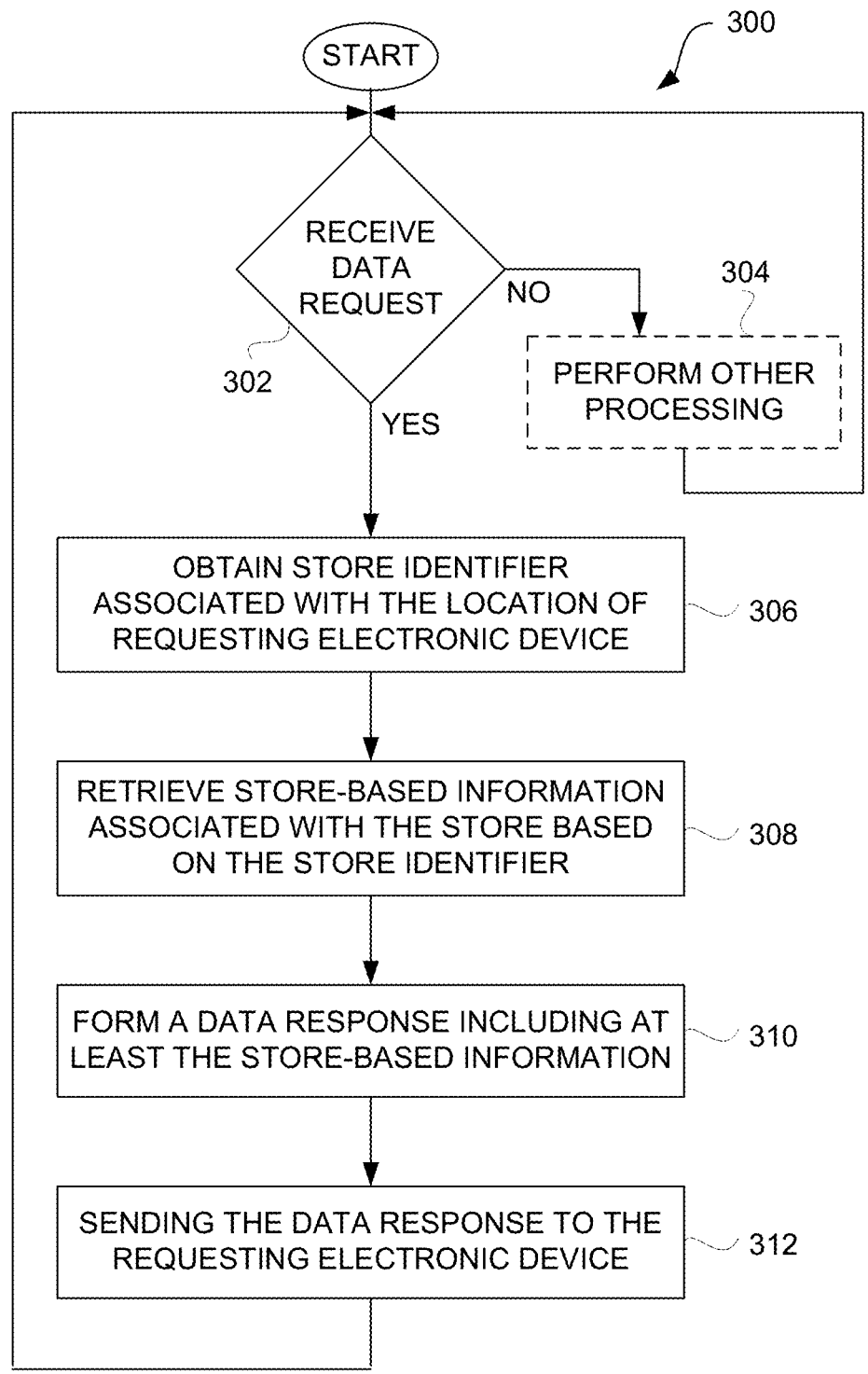
FIG. 3 is a flow diagram of a data request process according to one embodiment of the invention.

FIG. 3 is a flow diagram of a data request process 300 according to one embodiment of the invention. The data request process 300 is processing performed by a server. For example, the server can be an online media store server, such as the online media store server 102 illustrated in FIG. 1.

The data request process 300 can begin with a decision 302. The decision 302 determines whether a data request has been received. When the decision 302 determines that a data request has not been received, other processing can optionally be performed 304 by the server. The other processing 304 is, for example, various other different types of data or information requests, such as requests to browse, search, preview or purchase media items available on an online media store hosted by the online media store server. Following the block 304, the data request process 300 returns to repeat the decision 302.

When the decision 302 determines that a data request has been received, a store identifier associated with the location of the requesting electronic device (e.g., computing device) can be obtained 306. For example, in one implementation, the store identifier can be provided with the data request and thus obtained 306 from the data request. Next, store-based information associated with the store can be retrieved 308 based on the store identifier. In one implementation, the store-based information for the particular store associated with the store identifier can be retrieved 308 from a server that stores or manages information for various stores, such as the central store server 108 illustrated in FIG. 1. A data response including at least the store-based information can then be formed 310. The data response can then be sent 312 to the requesting electronic device. Following the block 312, the data request process 300 can return to repeat the decision 302 and subsequent blocks so that subsequent data requests can be similarly processed.

The store-based information being requested or received by the page request process 200 or the data request process 300 can vary with implementation. One example of store-based information is media playing information associated with a particular store. The store-based information can, for example, indicate a particular media item (e.g., song, movie, music video, etc.) that is playing at a store. The client device can present a graphical user interface relevant to the particular media item. The graphical user interface can display descriptive information concerning the particular media item. For example, in the case of a song, the descriptive information can include artist, album, and song name. The graphical user interface can also facilitate navigation to additional related information for review or purchase of media items.

Figure 4A:
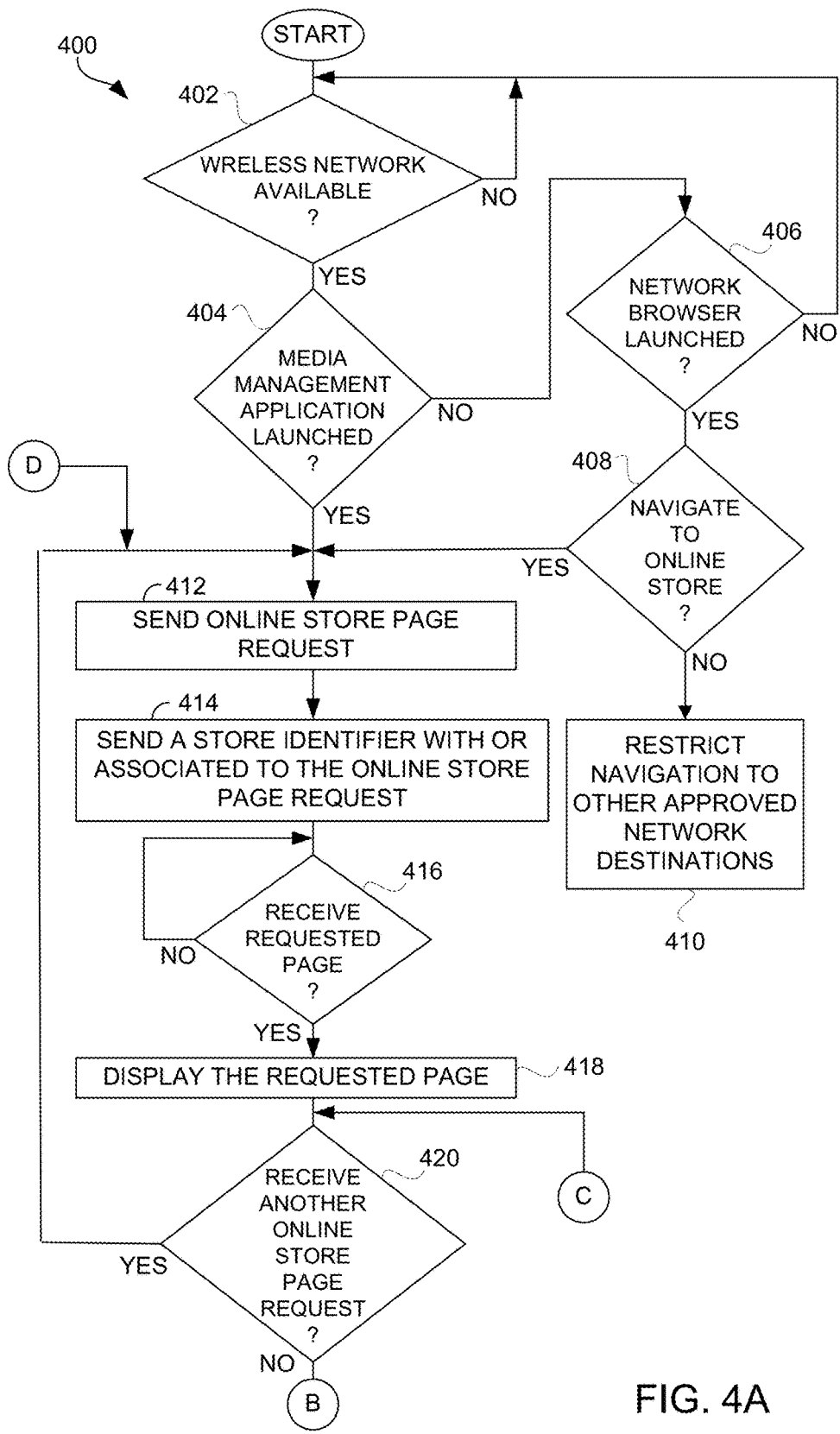
FIGS. 4A and 4B are flow diagrams of a page request process according to another embodiment of the invention.
Figure 4B:
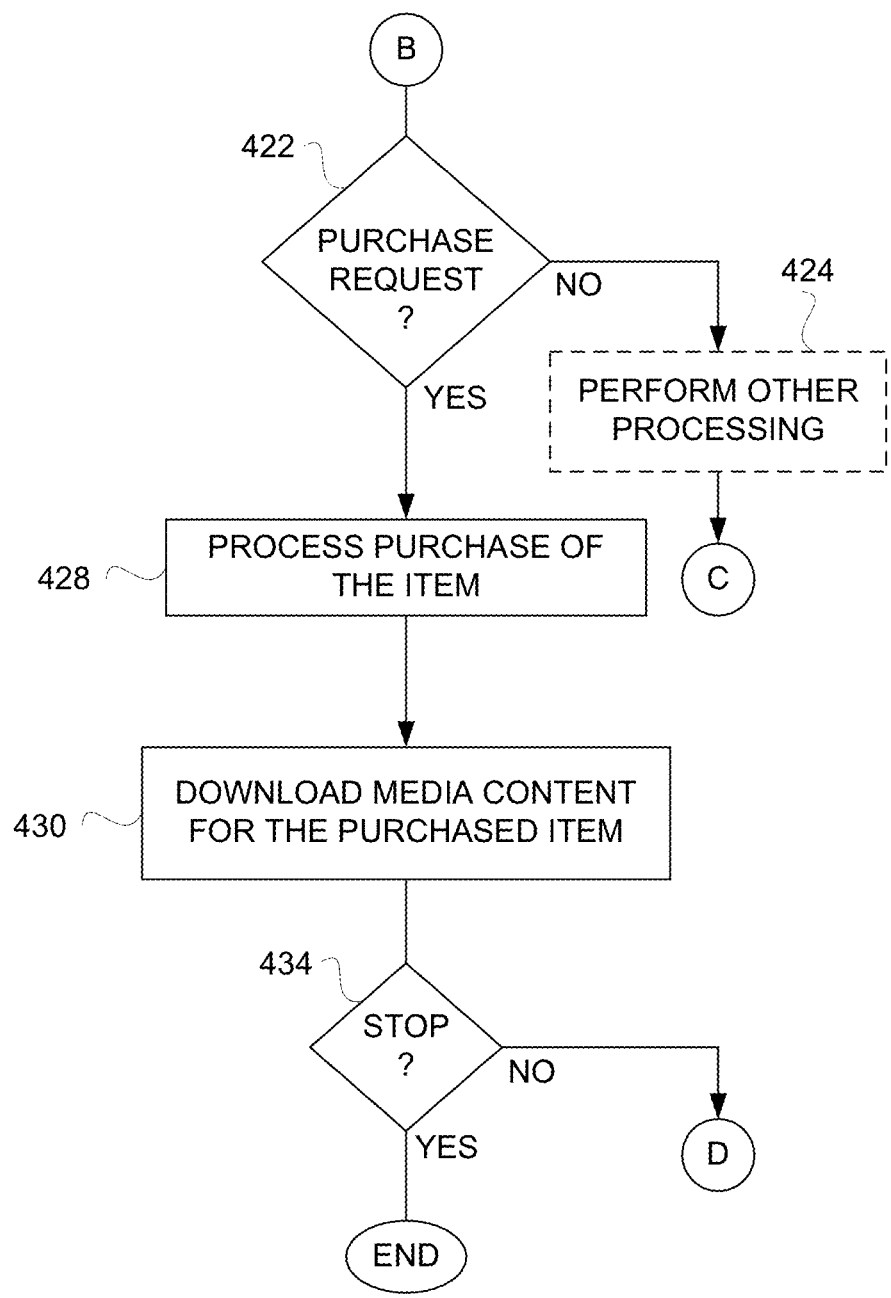

FIGS. 4A and 4B are flow diagrams of a page request process 400 according to one embodiment of the invention. The page request process 400 is, for example, performed by a client device, such as a media device or other electronic device having wireless networking capability and a display screen. In one embodiment, the client device is a portable computing device (e.g., laptop computer) having wireless data capabilities. In another embodiment, the client device is a mobile phone having wireless voice and wireless data capabilities.

The page request process 400 can begin with a decision 402 that determines whether a wireless network is available. The wireless network is generally commensurate with the location of a store. Consequently, the availability of the wireless network to the client device can serve as an indication that the client device (and thus its user) is physically present at the store. On the other hand, when the wireless network is not available to the client device, it is can serve as an indication that the client device (and thus its user) is not physically at the store.

When the decision 402 determines that a wireless network is available to the client device, a decision 404 can determine whether a media management application has been launched. When the decision 404 determines that a media management application has not been launched, a decision 406 can determine whether the network browser has been launched. When the decision 406 determines that a network browser has not been launched, and then the page request process 400 returns to repeat the decision 402. Accordingly, further processing by the page request process 400 can require either launching of a media management application or a network browser. One example of media management application is the iTunes™ application program available from Apple Inc. of Cupertino Calif. One example of a network browser is Safari™ network browser available from Apple Inc. of Cupertino, Calif.

When the decision 406 determines that a network browser has launched, a decision 408 can determine whether to navigate to an online store (e.g., online media store). When the decision 408 determines that the network browser (or its user) is not attempting to navigate to an online store, navigation can be restricted 412 such that only certain approved network destinations are accessible. Here, according to one embodiment, the wireless network being utilized by the network browser can limit the ability for the network browser to access network destinations that are not approved. For example, the page request process 400 could permit the network browser to access only those network addresses that are listed in a set of approved network addresses. Attempts to access other non-approved network destinations could then be restricted 410. As an example, network access can be blocked for non-paying users but permitted for paying users.

On the other hand, when the decision 404 determines that a media management application has launched or when the decision 408 determines that the network browser has been utilized to navigate to an online store that is approved for access, the page request process 400 can continue. In particular, when the page request process 400 continues, an online store page request can be sent 412. Here, the online store page request can be sent 412 to a server, such as an online media store server that hosts an online store. The online store page request requests information available from the online store. In addition, a store identifier can be sent 414 with or associated to the online store page request.

A decision 416 determines whether the requested page has been received. When the decision 416 determines that the requested page has not been received, the page request process 400 can await the requested page. On the other hand, when the decision 416 determines that the requested page has been received, the requested page can be displayed 418.

Next, a decision 420 determines whether another online store page request has been received. When the decision 420 determines that another online store page request has been received, the page request process 400 can return to repeat the block 412 and subsequent blocks so that the other online store page request can be similarly processed. Here, it is assumed that the another online store page request is with respect to the same online store, and thus still an improved network destination. On the other hand, when the decision 420 determines that another online store page request has not been received, a decision 422 determines whether a purchase request has been received. When the decision 422 determines that a purchase request has not been received, then other processing can be optionally performed 424 prior to returning to repeat the decision 420. The other processing can be other actions that can be performed with respect to the requested page that is being displayed 418.

On the other hand, when the decision 422 determines that a purchase request has been received, the one or more items being purchased can be processed 428. The media content associated with the purchased item can then be downloaded 430 to the device. Depending on the type of client device being used, some items that can be purchased may or may not be useable on the client device. Hence, in one embodiment, items that have been purchased that are either too cumbersome to download or not useful on the client device are not delivered (e.g., downloaded) to the client device. In one embodiment, such items that are not delivered to the client device can be subsequently delivered to another device associated with the requestor (purchaser).

Next, a decision 434 determines whether the page request process 400 should stop. When the decision 434 determines that the page request process 400 should not stop, the page request process 400 can return to repeat the block 412 and subsequent blocks. On the other hand, when the decision 434 determines that the page request process 400 should stop, the page request process 400 can end.

Figure 5:
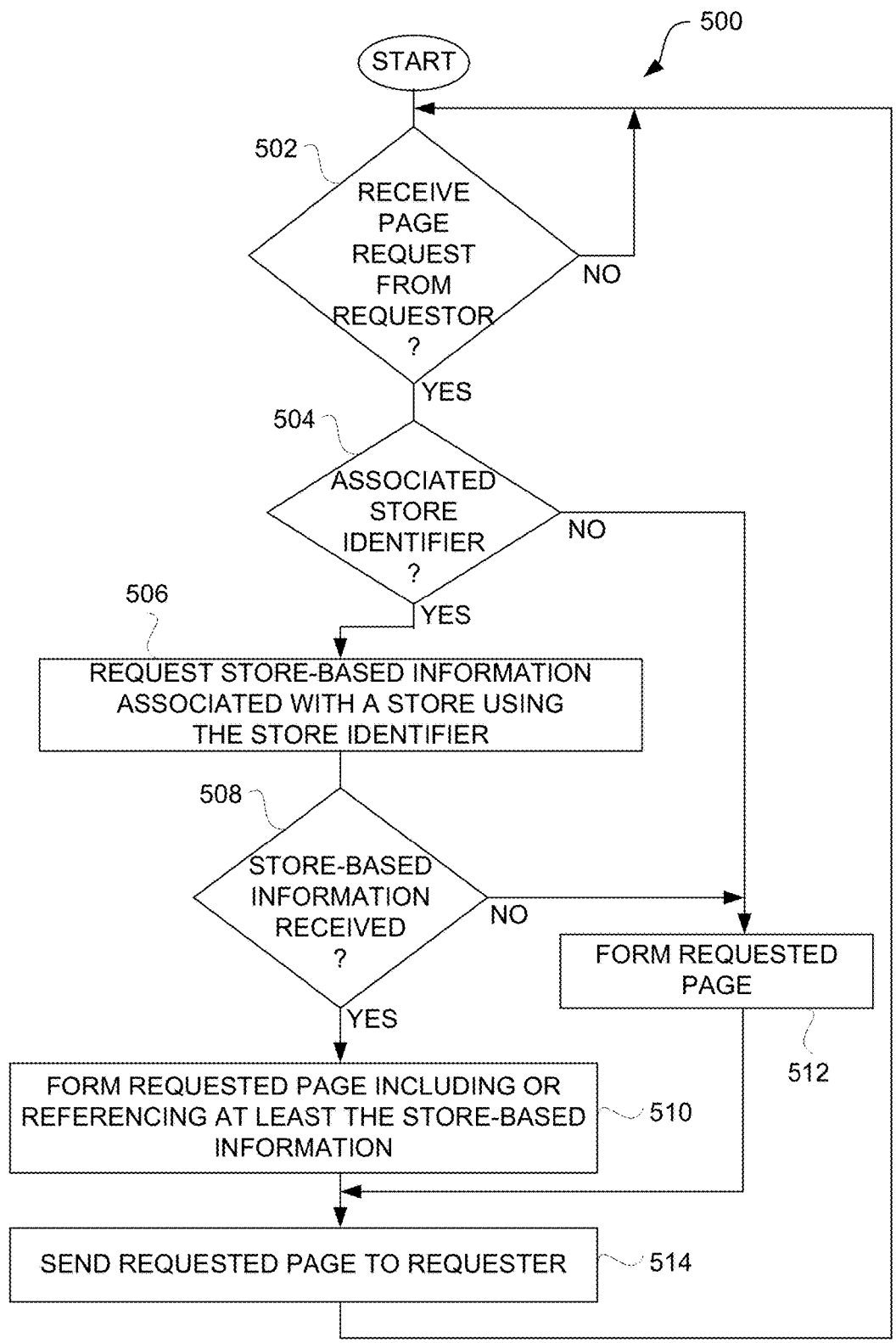
FIG. 5 is a flow diagram of a page response process according to still another embodiment of the invention.

FIG. 5 is a flow diagram of a page response process 500 according to one embodiment of the invention. The page response process 500 is, for example, performed by a server. For example, the server can be an online media store server, such as the online media store server 102 illustrated in FIG. 1.

The page response process 500 can begin with a decision 502 that determines whether a page request has been received from a requester. When the decision 502 determines that a page request has not been received, the page response process 500 can await such a request. Once the decision 502 determines that a page request has been received from a requester, a decision 504 it can determine whether a store identifier is associated with the request. In this regard, the page request itself can directly include the store identifier or the page request can indirectly reference the store identifier. The store identifier is an identification of a particular store from which the requestor (namely, a client device used by the requester) is located.

When the decision 504 determines that the page request has a store identifier associated with it, store-based information associated with a store using the store identifier can be requested 506. In one embodiment, the store-based information for a store is requested from a server, such as the central store server 108 illustrated in FIG. 1. Next, a decision 508 determines whether store-based information has been received. When the decision 508 determines that the stored-based information has been received, a requested page can be formed 510 with the requested page including or referencing at least the store-based information.

Alternatively, when the decision 508 determines that store-based information is not received, then the page response process 500 can assume that the store-based information is currently unavailable and thus form 512 the requested page without any store-based information. Also, when the decision 504 determines that the page request does not have a store identifier associated therewith, the page response process 500 can form 512 the requested page without any store-based information. Following the block 510 or the block 512, the page response process 500 can operate to send a 514 the requested page to the requester. After the requested page has been sent 514, the page response process 500 can return to repeat the decision 502 and subsequent blocks so that a subsequent page request can be similarly processed.

In the page response process 500, a page is returned to a requester. In one embodiment, the page returned to the requestor can be displayed on the client device used by the requester. If the requestor is at a particular store that supports monitoring of store-based information, the displayed page can include store-based information as well as other content. For example, the store-based information can pertain to one or more items being played at the store and the other content can be information about one or more media items available for purchase on an online media store. Alternatively, If the requester is not at a store that supports monitoring of store-based information, the displayed page can include the other content without the store-based information.

In an alternative embodiment, a server can evaluate whether the client device is in a store and form (e.g., select, generate) the appropriate page to be delivered to the client device. In contrast, in other embodiment such as discussed above, a client device understands that it is in a store and requests the appropriate pages (data) from the server. In either case, store-based information can be delivered to a client device which can present a graphical user interface (or display screen) using the store-based information.

Figure 6:
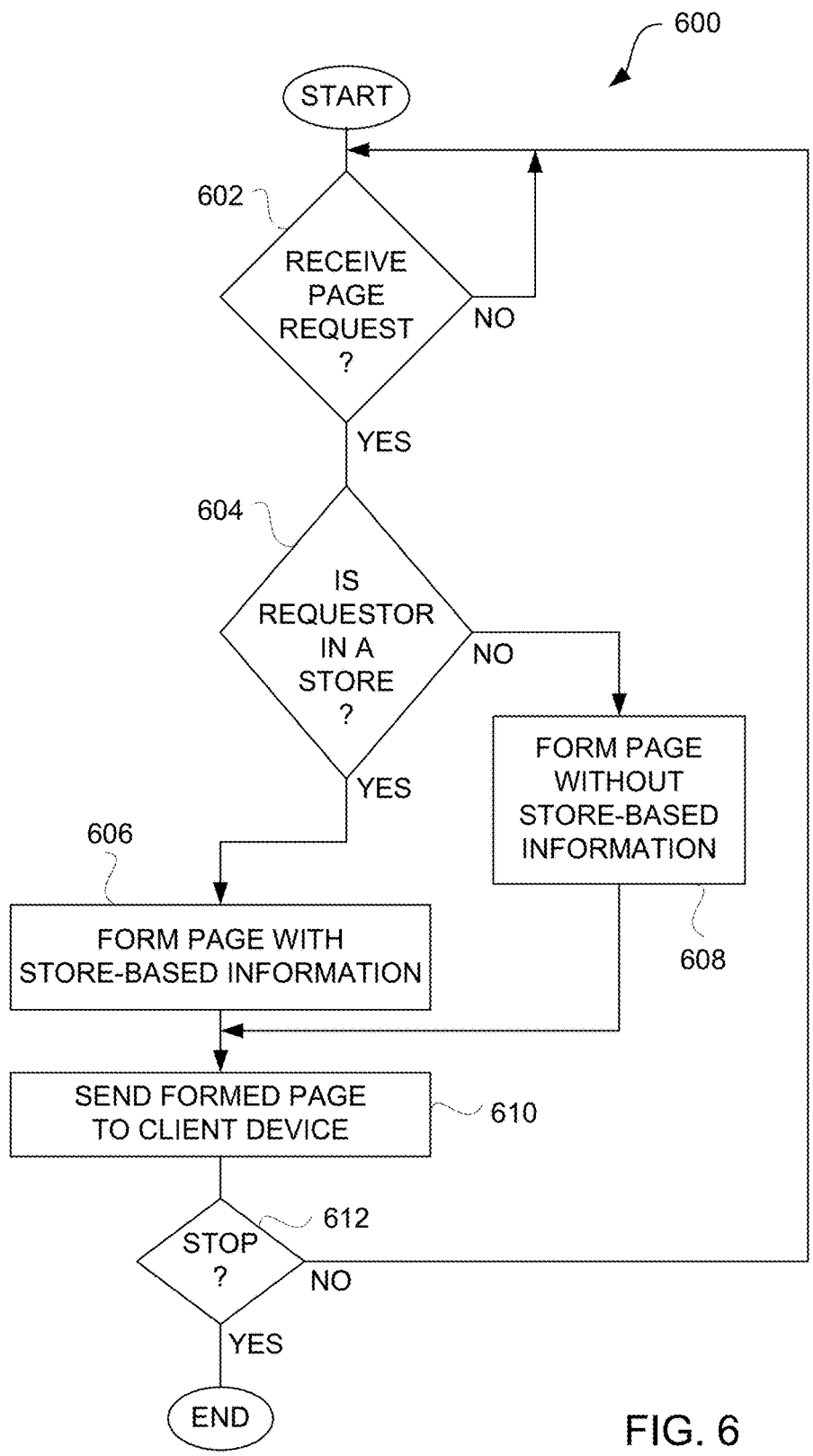
FIG. 6 is a flow diagram of a page customization process according to one embodiment of the invention.

FIG. 6 is a flow diagram of a page customization process 600 according to one embodiment of the invention. The page customization process 600 is, for example, performed by a server such as an online media store server that hosts an online media store.

The page customization process 600 can begin with a decision 602. The decision 602 can determine whether a page request has been received. When the decision 602 determines that a page request has not been received, the page customization process 600 can await such a request. However, once the decision 602 determines that a page request has been received, the page customization process 600 can perform further processing to service the page request. In this regard, once the decision 602 determines that a page request has been received, a decision 604 can determine whether the requestor for the page is in a store. Here, the requestor (user) operates an electronic device (client device), such as a portable electronic device. The portable electronic device can be carried by its user to various different locations. In some of those locations, the portable electronic device may be able to gain wireless access to a network, such as a WiFi network, which in turn enables access to a global network (e.g., the Internet). In such cases, the decision 604 of the page customization process 600 can determine whether the requester, namely, the electronic device used by the requester, is in a store. If the electronic device is in a store, it can be assumed that the portable computing device has wireless access to a local network within the store. In one embodiment, the network or the networking infrastructure (e.g., WiFi wireless network) at the store facilitates access to the global network and can also inform another device (e.g., the electronic device and/or server) as to whether or not the electronic device is within the store. Various other ways can be used to determine whether an electronic device is within a store, such as using location technology (e.g., GPS, triangle navigation, or localized beacons).

When the decision 604 determines that the requestor (electronic device) is within a store, a page can be formed 606 that includes store-based information. In one embodiment, the page has its ordinary content (default content) and the store-based information is additional content that is included in the page. Alternatively, when the decision 604 determines that the requestor (electronic device) is not in a store, the page can be formed 608 without including store-based information. In one embodiment, the page that is formed 608 thus includes only its ordinary content.

Following the blocks 606 and 608, the formed page can be sent 610 to the client device associated with the requestor. Following the block 610, a decision 612 can determine whether the page customization process 600 should stop. When the decision 612 determines that the page customization process 600 should not stop, then the page customization process 600 returns to repeat the decision 602 and subsequent blocks so that another page request could be similarly processed. Alternatively, when the decision 612 determines that the page customization process 600 should stop, then the page customization process 600 can end.

As used herein, a page can refer to a graphical user interface or a display screen that can be presented on a display device.

According to one aspect of the invention location-specific information, such as store-specific information, can be presented on a display associated with a computing device while resident at an establishment. The location-specific information can be presented as a graphical user interface, such as a screen or page presented on a display of the computing device. The portable computing device can, for example, be a portable electronic device having a display, such as a portable computer (e.g., notebook or laptop computer), personal digital assistant, or mobile communication device.

FIGS. 7-13 pertain to graphical user interfaces, such as pages, according to one implementation that can be presented on a display. The graphical user interfaces illustrated in FIGS. 7-13 are particularly suitable for display that has a screen area larger than 10×10 centimeters (or approximately 4"×4"), though such is not a requirement.

Figure 7:
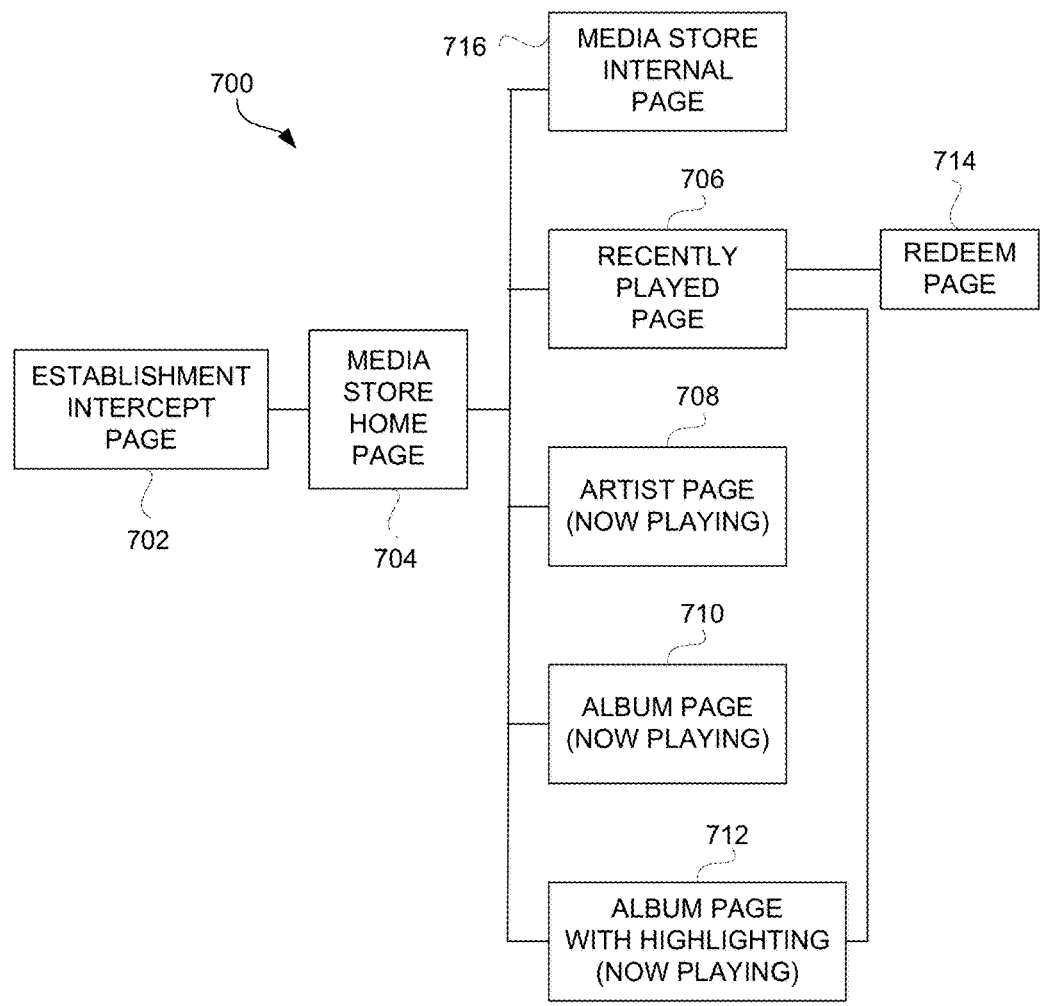
FIG. 7 is a diagram of a navigation arrangement according to one embodiment of the invention.

FIG. 7 is a diagram of a navigation arrangement 700 according to one embodiment of the invention. The navigation arrangement 700 pertains to navigation through a hierarchy of pages (or screens) associated with a computing device, such as a portable computer. When a user of the computing device it is located at an establishment, the computing device can be connected to a wireless network available at the establishment. The local wireless network can permit the user with access to the Internet. As noted above, the access to the Internet can be limited to certain network addresses. Nevertheless, since the establishment can control the wireless network access, the use of the computing device to access the Internet can cause an establishment intercept page 702 to be initially displayed on a display associated with the computing device. The establishment intercept page 702 can display establishment information. From the establishment intercept page 702, a user can access an online media store home page 704.

The online media store home page 704 can allow the user to search, browse, preview and/or purchase digital media assets from an online media store. Additionally, the media store home page 704 can including a now playing module that allows a user to navigate to various different pages that provide additional information concerning media being played at the establishment. In particular, from the media store home page 704 (via the now playing module), a user can navigate to a recently played page 706, an artist page 708 for a now playing media item, an album page 710 for a now playing media item, or an album page 712 for a now playing media item where the now playing media item is highlighted. Still further, the navigation arrangement 700 can permit a user to navigate to a redeem page 714 where a card (e.g., gift card) or other store credit can be redeemed. For example, the user can navigate to the redeem page 714 by way of the media store home page 704 or the recently played page 706. The artist page 708 for a now playing media item is an artist page provided by the online media store that is descriptive of the particular artist of the now playing media item. The album page 710 for a now playing media item is an album page provided by the online media store that is descriptive of the particular album associated with the now playing media item. The album page 712 for a now playing media item where the now playing media item is highlighted is descriptive of the particular album associated with the now playing media item but also indicated the now playing media item in a track listing by highlighting.

Also, from the media store home page 704, a user can also navigate to a media store internal page 716. The media store internal page associated with a page produced by the online media store. The media store internal page 716 can include a now playing module that facilitates the user transitioning to the pages 706-714 discussed above.

Figure 8:
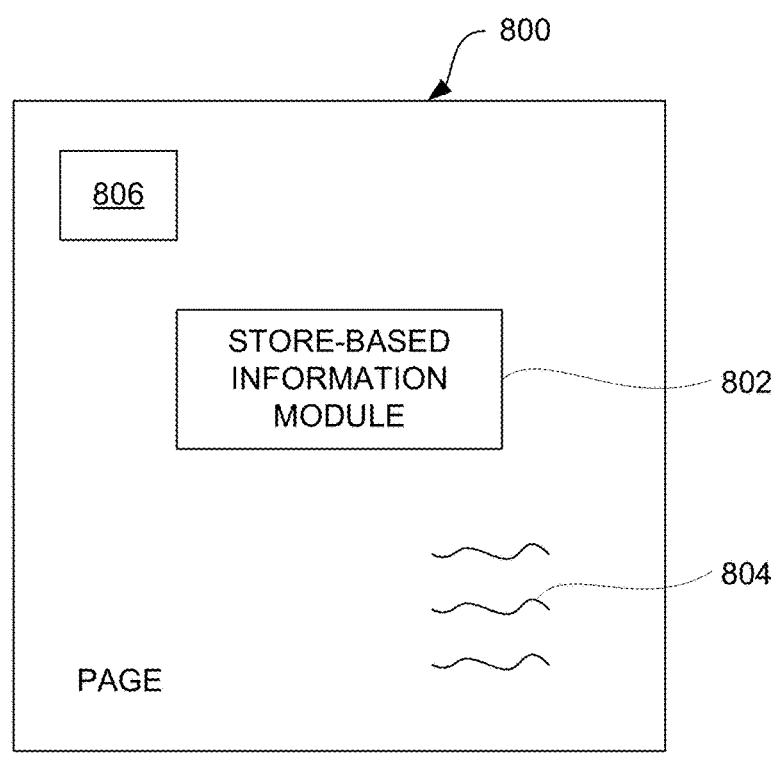
FIG. 8 is a diagram of an exemplary page according to one embodiment of the invention.

FIG. 8 is a diagram of an exemplary page 800 according to one embodiment of the invention. The exemplary page 800 is, for example, suitable for use as any of the pages discussed above with regard to the navigation arrangement 700 illustrated in FIG. 7. The exemplary page 800 includes a now playing module 802, a text portion 804 and a graphic portion 806. The now playing module 802 can thus represent a portion of a page (or screen) on any of the various pages discussed above with reference to FIG. 7. The now playing module 802 has a size, configuration and placement that varies depending upon implementation. The now playing module 802 can include information and more links to store-based information available from an online media store. The text portion 804 and the graphic portion 806 can contain information concerning the establishment or concerning one or more digital media assets available from the online media store.

In one embodiment, the exemplary page 800 is available for display on a computing device while that the computing device is at an establishment. Hence, when the computing device is at the establishment, the exemplary page 800 can be presented to the user of the computing device. In this regard, in one implementation, a remote server provided the exemplary page 800 to the computing device can control whether or not the now playing module 802 is included. In another implementation, the computing device can control whether or not the now playing module 802 is included. For example, a page provided to the computing device can include a "condition include" statement for the now playing module 802; hence, if the computing device is in an establishment, the condition holds true and the "include" statement is processed to retrieve and display the now playing module 802.

Figure 9A:
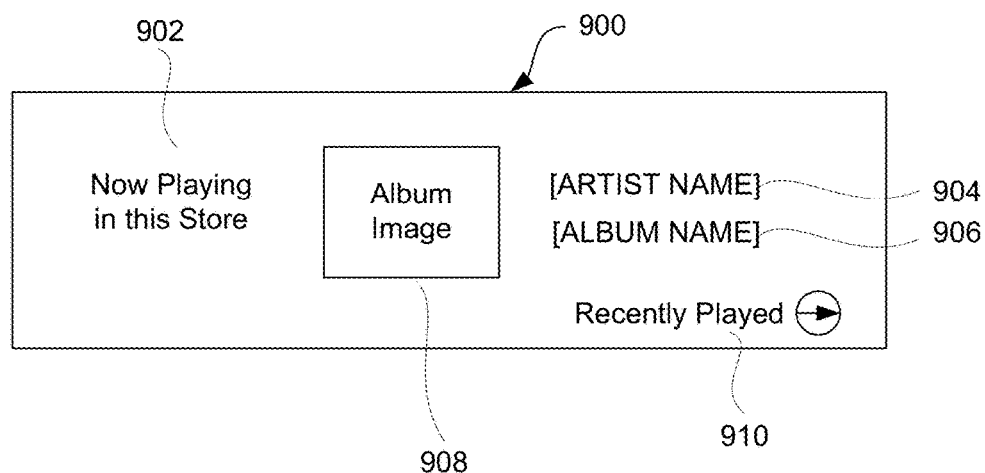
FIG. 9A is a diagram of a now playing module according to one embodiment of the invention.

FIG. 9A is a diagram of a now playing module 900 according to one embodiment of the invention. The now playing module 900 pertains to a particular digital media asset that is teamed to be now playing at an establishment. The now playing module 900 includes a now playing indicator 902, an artist name 904, an album name 906 and an album image 908. The artist name 904, the album name 906 and the album image 908 are descriptive of (e.g., metadata of) the particular digital media asset that is deemed to be now playing at the establishment. The now playing module 900 can further include a recently played indicator 910 that can provide or serve as a reference (or link) to recently played digital media assets. In an alternative embodiment, the now playing module could include (e.g., list) the recently played digital media assets.

Figure 9B:
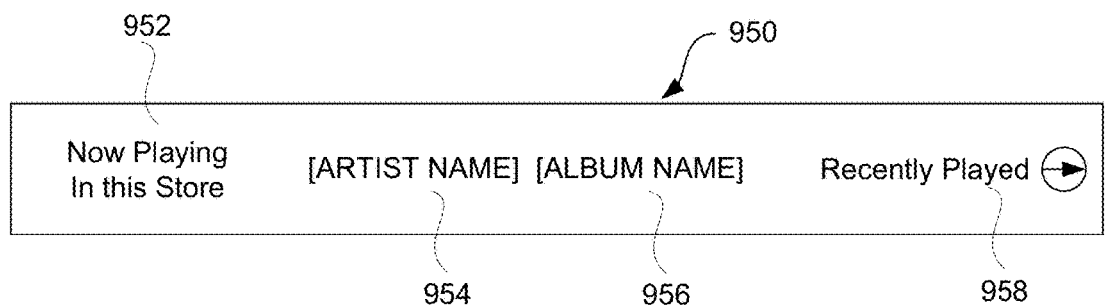
FIG. 9B is a diagram of a now playing module according to another embodiment of the invention.

FIG. 9B is a diagram of a now playing module 950 according to another embodiment of the invention. The now playing module 950 includes a now playing indicator 952, an artist name 954, an album name 956, and a recently played indicator 958. The recently played indicator 958 can provide or serve as a reference (or link) to recently played digital media assets. The now playing module 950 is, in one implementation, provided in the form of a bar that is suitable for inclusion on a page (or screen) to be displayed by a computing device while consuming little area of the page.

Although the embodiments discussed above with respect to FIGS. 7-9B concerning now playing information, it should be understood that these figures are more generally suitable for accessing location-specific information (or location-based information), of which now playing information is one variety.

When a page (or screen) is to be presented to a user operating the computing device, if the computing device (and thus the user) are located at an establishment that provides the wireless access capability as discussed above, and the page being presented to the user via the computing device can include location-based information. In one embodiment, the location-based information is store-based information that can be included on the page. In one implementation, the establishment-based information (or store-based information) can pertain to now playing information at the establishment. The placement of the location-based information on the particular page can vary depending upon implementation.

Figure 10:
FIG. 10 is a screenshot of an exemplary media store home page according to one embodiment of the invention.

FIG. 10 is a screenshot of an exemplary media store home page 1000 according to one embodiment of the invention. The media store home page 1000 is, for example, suitable for use as the media store home page 704 illustrated in FIG. 7. The media store home page 1000 includes a media source region 1002 that specifies a particular one of a plurality of different media sources that are available for selection. As illustrated in FIG. 10, a "iTunes store" source is highlighted 1004 to indicate selection of an online media store (which is remotely located) as the media source. A media region 1006 displays information concerning a plurality of media items that are available from the online media store. Additionally, according to one embodiment of the invention, the media store home page 1000 can include a now playing module 1008. In this example, the now playing module 1008 represents an implementation of the now playing module 900 illustrated in FIG. 9A.

Figure 11:
FIG. 11 is a screen shot of an exemplary recently played page according to one embodiment of the invention.

FIG. 11 is a screen shot of an exemplary recently played page 1100 according to one embodiment of the invention. The recently played page 1100 is, for example, suitable for use as the recently played page 706 illustrated in FIG. 7. The recently played page 1100 can also be referred to as a now playing page since it contains not only now playing formation but also recently played information. The recently played page 1100 includes a media source region 1102 that specifies a particular one of a plurality of different media sources that are available for selection. As illustrated in FIG.

11, a "iTunes store" source is highlighted 1104 to indicate selection of an online media store (which is remotely located) as the media source. A now playing region 1106 and a recently played listing region 1108 are also presented in the recently played page 1100. The now playing region 1106 and the recently played listing region 1108 are associated with a navigation tab 1110 which indicates that the user has navigated to a detailed screen concerning media content now playing at an establishment (e.g., Starbucks). In the now playing region 1106 includes a now playing indicator 1112 as well as an artist name 1114, an album name 1116 and an image 1118 associated with the media item that is now playing at the establishment. The now playing region 1106 can also include a redeem link 1120 that allows navigation to a redeem page. The recently played listing region 1108 displays a list 1122 of media items (e.g., songs) that have recently been played at the establishment. The user can navigate from the list 1122 to media store internal pages, such as an album page or artist page. A user can also initiate purchase of any of the media items in the list 1122 from the online media store.

Figure 12:
FIG. 12 is a screenshot of an exemplary media store internal page according to one embodiment of the invention.

FIG. 12 is a screenshot of an exemplary media store internal page 1200 according to one embodiment of the invention. The media store internal page 1200 is, for example, suitable for use as the media store internal page 716 illustrated in FIG. 7. The media store internal page 1200 includes a media source region 1202 that specifies a particular one of a plurality of different media sources that are available for selection. As illustrated in FIG. 12, "iTunes store" source is highlighted 1204 to indicate selection of an online media store as the media source. A media region 1206 displays information concerning a plurality of media items that are available from the online media store. Various different visual descriptors can be used to identify the various media items. Additionally, according to one embodiment of the invention, the media store internal page 1200 can include a now playing module 1208. In this example, the now playing module 1008 represents an implementation of the now playing module 950 illustrated in FIG. 9B. The now playing module 1208 includes a now playing indicator 1210 as well as an artist name 1212 and album name 1214 associated with the media item that is now playing at the establishment. The now playing module 1208 can also include a recently played reference (link) 1216 that allows navigation to a recently played page (e.g., the recently played page 1100 illustrated in FIG. 11).

Figure 13:
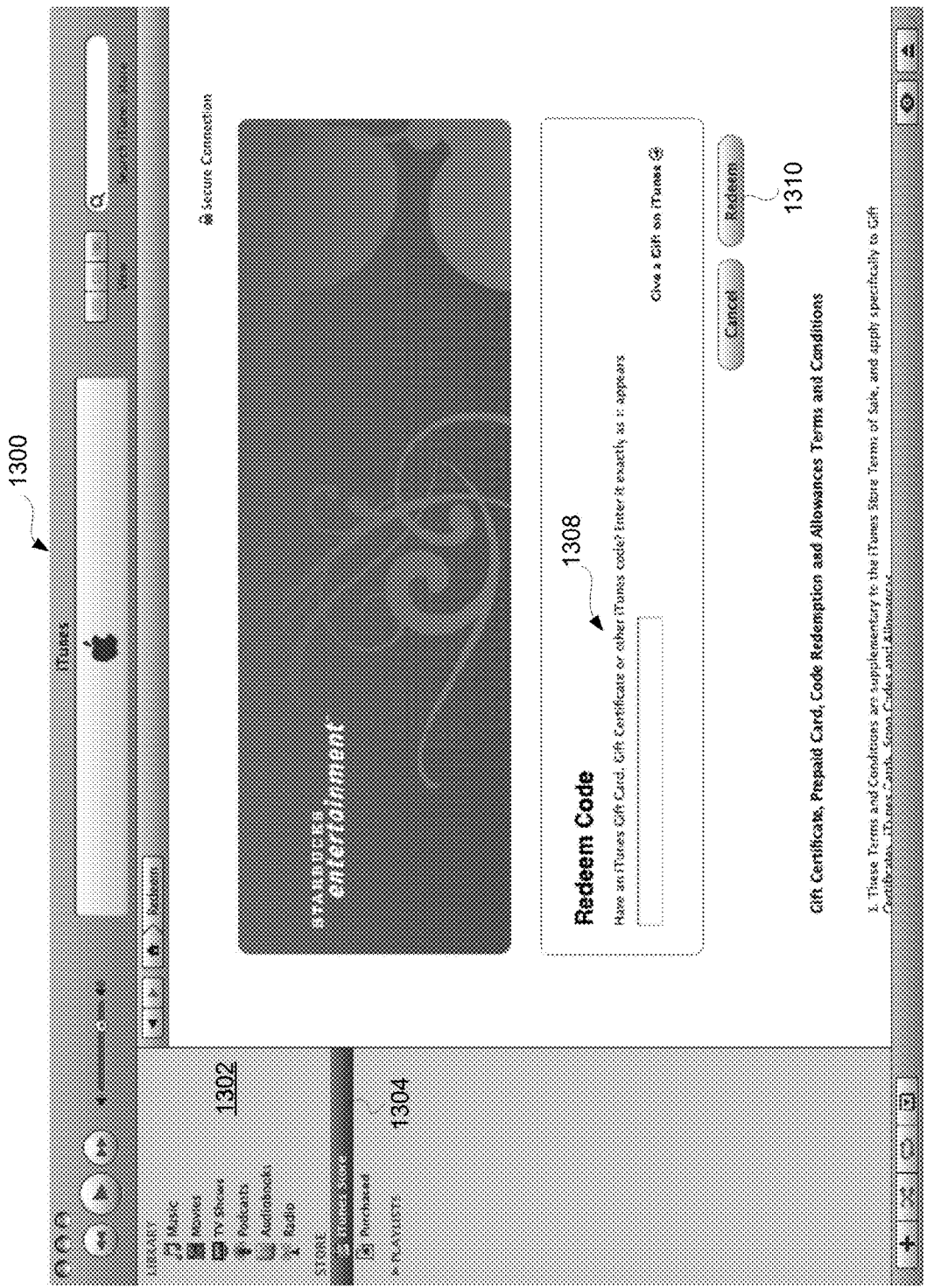
FIG. 13 is a screenshot of an exemplary redeem page according to one embodiment of the invention.

FIG. 13 is a screenshot of an exemplary redeem page 1300 according to one embodiment of the invention. The redeem page 1300 is, for example, suitable for use as the redeem page 714 illustrated in FIG. 7. The redeem page 1300 includes a media source region 1302 that specifies a particular one of a plurality of different media sources that are available for selection. As illustrated in FIG. 13, "iTunes store" source is highlighted 1304 to indicate selection of an online media store as the media source. A navigation tab 1306 indicates that the user has navigated to a redeem page. The redeem page 1200 include a redeem region 1308 that ails a user to enter a code to redeem a gift card, gift certificate or other code. The redeem page 1300 also includes a redeem button 1320 that submits the redeem code for processing by a remote server, such as a remote server hosting the online media store.

FIGS. 14(a)-27 pertain to graphical user interfaces, such as pages, according to another implementation that can be presented on a display. The graphical user interfaces illustrated in FIGS. 14(a)-27 are particularly suitable for display that has a screen area smaller than 10×10 centimeters (or approximately 4"×4"), though such is not a requirement.

Figure 14A:
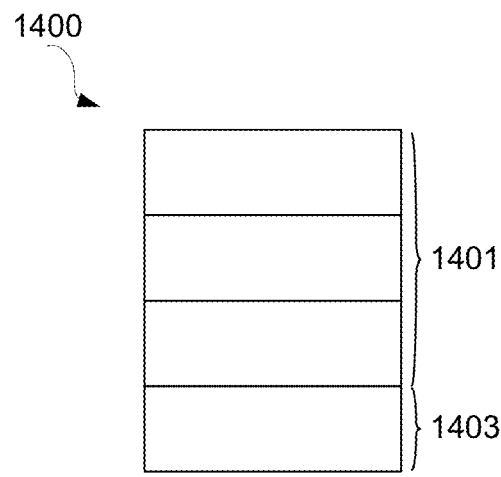
FIG. 14(a) is a block diagram of a portable electronic media store graphical user interface according to one embodiment of the invention.

FIG. 14(a) is a block diagram of a portable electronic media store graphical user interface 1400 according to one embodiment of the invention. The portable electronic media store user-interface 1400 can be used to interact with a media management application operating on a portable media device. The portable media device can, for example, be a mobile telephone capable of playing media assets. According to one embodiment of the invention, interacting with a media management application via the portable electronic media store user-interface 1400 allows the user of a portable media device to shop for and purchase media assets such as music or video files at an online media store via a wireless network, for example a cellular phone network or a WiFi network. In one embodiment of the invention, the portable electronic media store graphical user interface 1400 is only accessible (or usable) when a high-speed wireless network (e.g., a WiFi network) is detected. In this embodiment, if a user attempts to use the portable electronic media store user-interface 1400 and no suitable network is found, then the portable electronic media store user-interface 1400 can display an error message to the user.

In FIG. 14(a), the portable electronic media store user-interface 1400 has three media store display panels 1401. Media store display panels 1401 can be used, for example, for displaying graphics, text blocks and/or navigation buttons that identify corresponding individual media assets or groups of media assets (e.g., a music album or a collection of 'new releases'). In one embodiment of the invention, any of the graphics, texts blocks and/or navigation buttons can function as links (e.g., hyperlinks) to media content that is available for purchase at the online media store. Additionally, media store display panels 1401 can include one or more controls (e.g., 'Purchase' or 'Buy Now' buttons) to allow a user to purchase displayed media assets. Clearly, media store display panels 1401 can be implemented using various permutations and combinations of graphics, text blocks, and navigation buttons. Furthermore, the media store display panels 1401 can include dynamic elements as well as static elements. An example of a dynamic element in a media store display panel is a dynamic graphic (not shown) that changes periodically while cycling through a set of featured music artist graphics.

The portable electronic media store user-interface 1400 also includes a device control panel 1403. Device control panels 1403 can be used for displaying device controls, for example, a home button or a search button. The media store user-interface 1400 is only one configuration example; clearly other user-interface arrangements are possible.

Figure 14B:
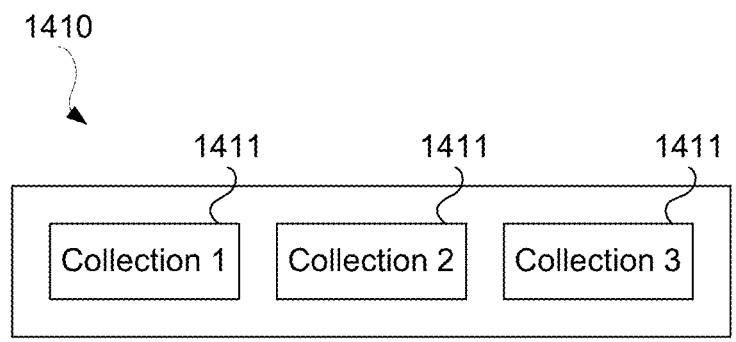
FIG. 14(b) is a block diagram of an exemplary media store navigation display panel according to one embodiment of the invention.
Figure 14C:
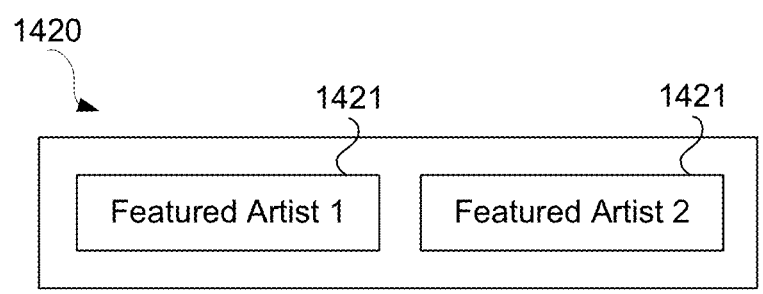
FIG. 14(c) is a block diagram of an exemplary featured artist display panel, according to one embodiment of the invention.
Figure 14D:
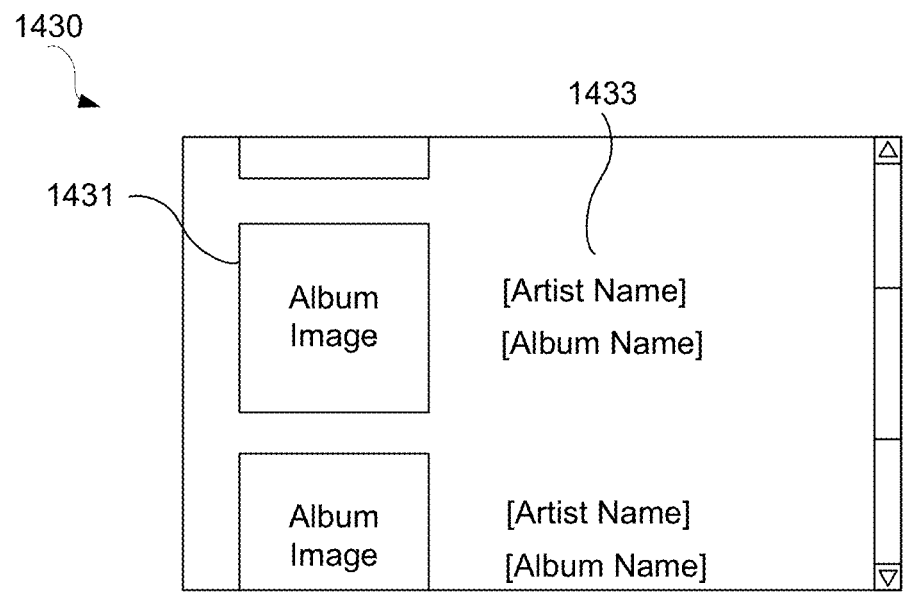
FIG. 14(d) a block diagram of an exemplary media browser display panel according to one embodiment of the invention.
Figure 14E:
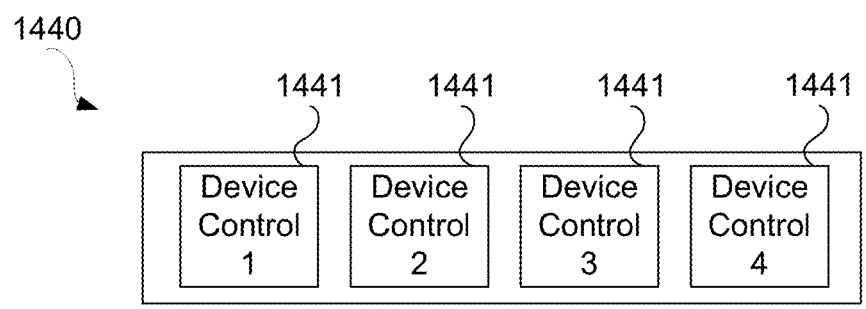
FIG. 14(e) a block diagram of an exemplary device control panel, according to one embodiment of the invention.
Figure 15A:
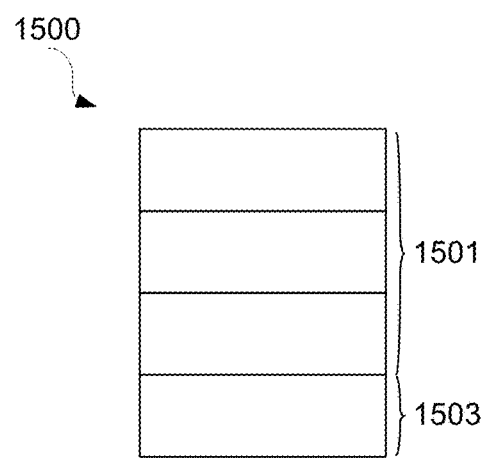
FIG. 15(a) is a block diagram of a portable electronic media store graphical user interface according to one embodiment of the invention.
Figure 15B:
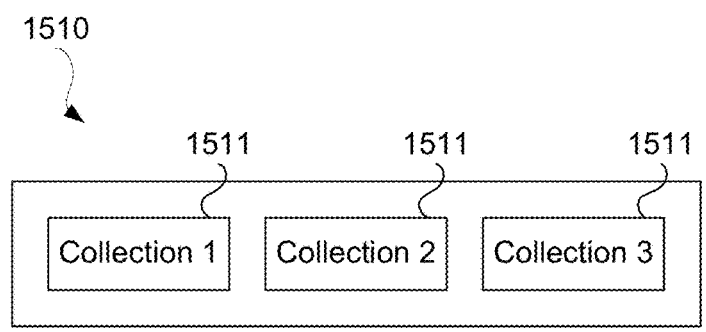
FIG. 15(b) is a block diagram of an exemplary media store navigation display panel according to one embodiment of the invention.
Figure 15C:
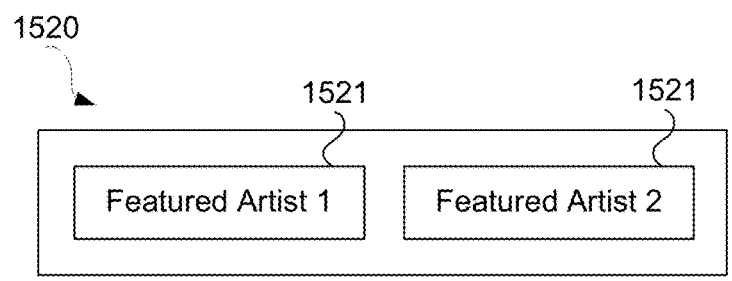
FIG. 15(c) is a block diagram of an exemplary featured artist display panel, according to one embodiment of the invention.
Figure 15D:
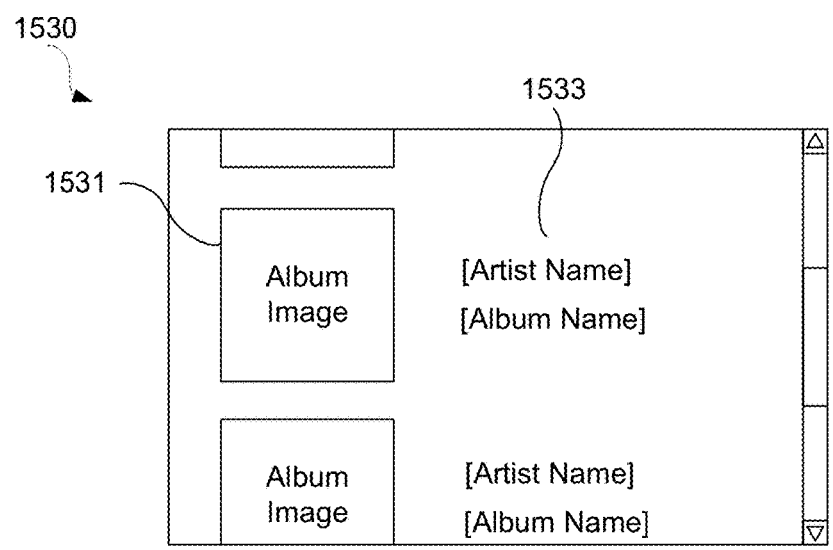
FIG. 15(d) is a block diagram of an exemplary media browser display panel according to one embodiment of the invention.
Figure 15E:
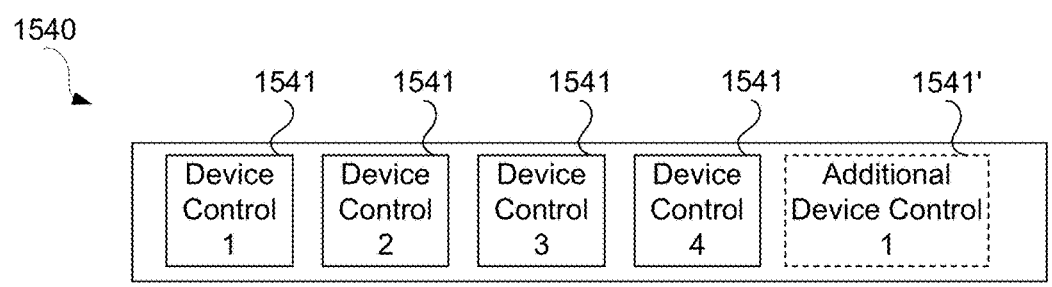
FIG. 15(e) is a block diagram of an exemplary device control panel, according to one embodiment of the invention.
Figure 15F:
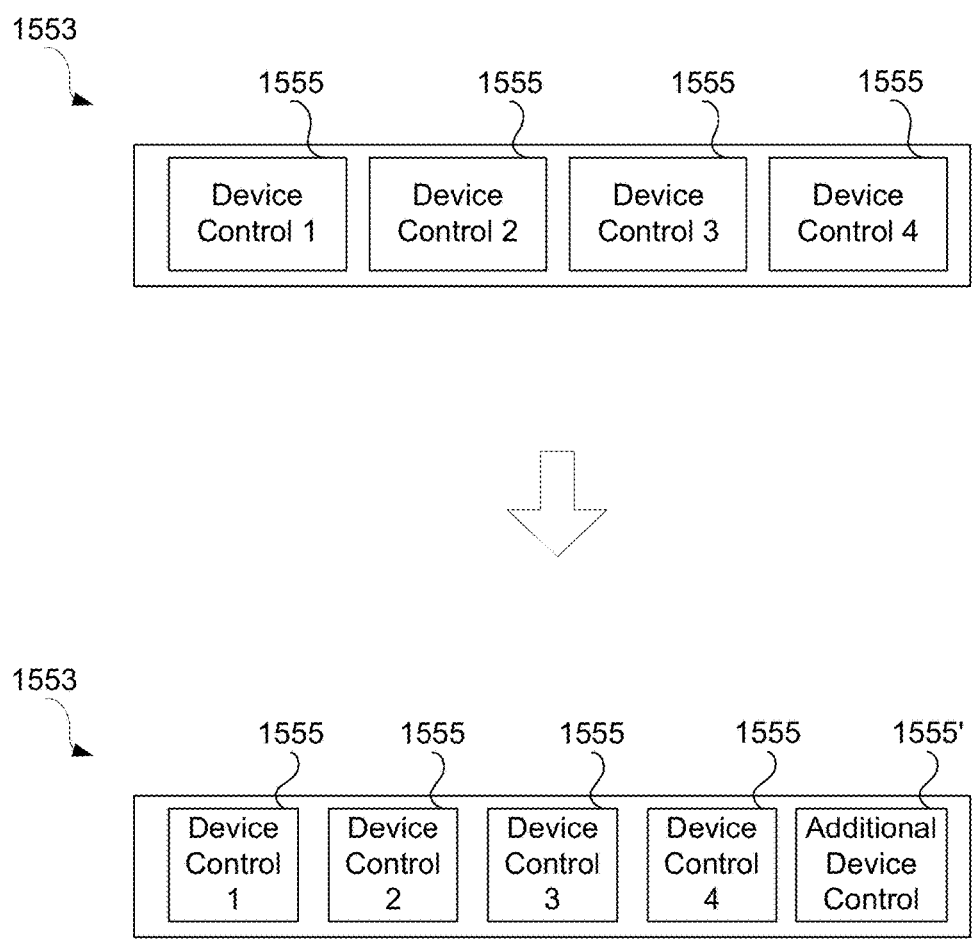
FIG. 15(f) is a block diagram of an exemplary transition between a device control panel and a device control panel according to one embodiment of the invention.
Figure 16A:
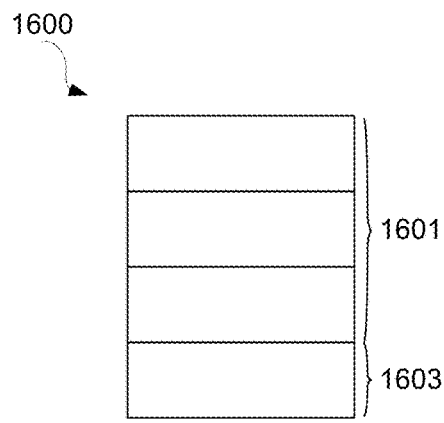
FIG. 16(a) is a block diagram of an enhanced portable electronic media store user-interface according to one embodiment of the invention.
Figure 16B:
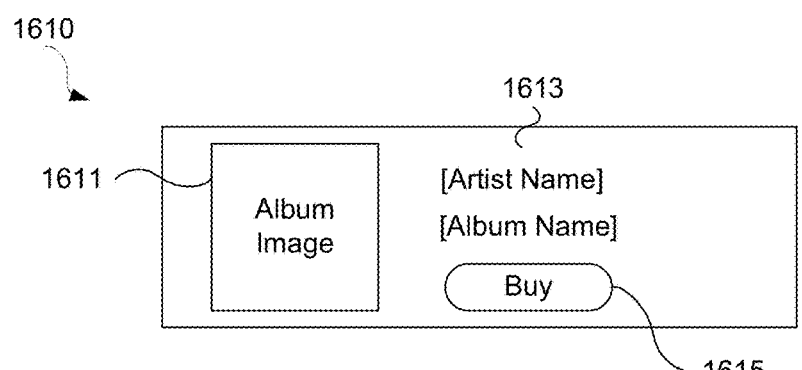
FIG. 16(b) is a block diagram of an exemplary 'Now Playing' display panel, according to one embodiment of the invention
Figure 16C:
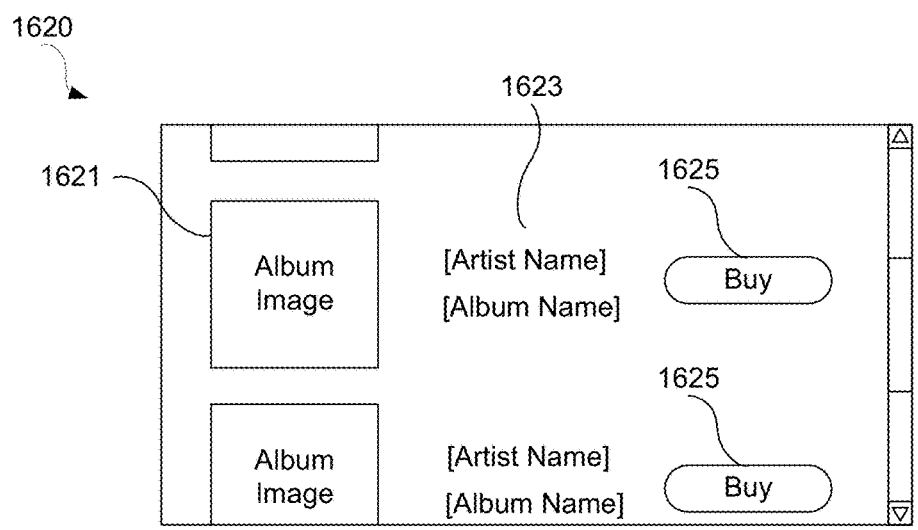
FIG. 16(c) is a block diagram of an exemplary 'Recently Played Songs' display panel, according to one embodiment of the invention.
Figure 16D:
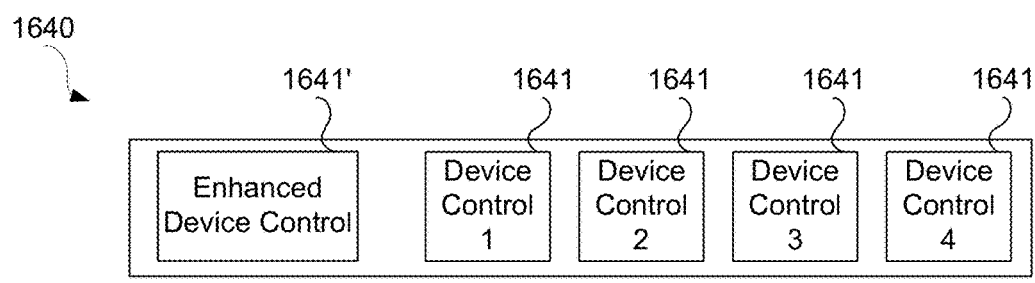
FIG. 16(d) is a block diagram of an exemplary device control panel, according to one embodiment of the invention.

Media store display panels 1401 come in a wide variety of types. FIGS. 14(b)-14(d) are illustrations of three possible media store display panels 1401.

FIG. 14(b) is a block diagram of an exemplary media store navigation display panel 1410 according to one embodiment of the invention. The media store navigation display panel 1410 is shown with three navigation buttons 1411. Navigation buttons 1411 are used to direct a user to media asset collections. Media asset collections can be any arbitrary grouping of media assets, such as music albums or media asset collections put together for marketing purposes, for example top ten lists, genre groupings, or lists of new releases.

FIG. 14(c) is a block diagram of an exemplary featured artist display panel 1420, according to one embodiment of the invention. The featured artist display panel 1420 is shown with two featured artist graphics 1421. These featured artist graphics 1421 can be, for example, promotional graphics encouraging the purchase of a particular artist's music. Featured artist 1421 graphics can be selected (e.g., clicked on using a mouse or tapped on using a touch-sensitive screen) by a user to direct that user to a featured artist page. Other media categories media can be featured as well, for instance featured songs, featured music videos, or featured albums.

FIG. 14(*d*) a block diagram of an exemplary media browser display panel 1430 containing one or more graphics 1431, for example album cover art, and one or more text blocks 1433, for example music artist name or a music album title. The graphics 1431 and text blocks 1433 can be arranged in a wide variety of ways, for example in scrollable lists for browsing. Alternately, a small number of graphics 1431 and/or text blocks 1433 can be prominently grouped such that it is not necessary to scroll in order to see the entire group.

FIG. 14(*e*) a block diagram of an exemplary device control panel 1440, according to one embodiment of the invention. The device control panel 1440 includes four device controls 1441. Device controls 1441 can include buttons or tabs that allow the user of the portable electronic media store user-interface 1400 to access the functionality of an online media store or the functionality of a portable electronic device upon which the portable media device user-interface 1400 is running. In one embodiment of the invention, the device controls 1441 include buttons that direct the user of the device to, for example, a search page, a top ten list, a featured music page, and a download queue. The number of controls 1441 in the device control panel can vary. For example, additional controls 1441 may appear in the device control panel 1440 when a network with additional functionality is available. For example, one or more additional controls 1441 may become available upon detecting a specific wireless network, such as a retail store's wireless network, that offers enhanced functionality and/or enhanced content.

FIG. 15(*a*) is a block diagram of a portable electronic media store graphical user interface (UI) 1500 according to one embodiment of the invention. The portable media device media store user-interface 1500 can replace or augment the portable media device media store user-interface 1400. The portable electronic media store user-interface can be used to interact with a media management application on a portable media device when the portable media device detects that it is in an area where media assets can be purchased and downloaded. For example, in the case where a retail store has a local wireless network that is available for use by their customers, access to media assets may be made available at an accessible online media store for purchase and download while they on the premises (i.e., connected to or within range of the network). In one embodiment of the invention, when a portable media device detects that it is in a wireless network, additional options can become available in the portable media store user-interface 1500. In another embodiment of the invention, location- or establishment-specific content and functionality can be accessed while using that particular retail establishment's network.

In FIG. 15(*a*), the portable electronic media store user-interface 1500 has three media store display panels 1501. Media store display panels 1501 can be used, for example, for displaying graphics, text blocks and/or navigation buttons that identify corresponding individual media assets or groups of media assets (e.g., a music album or a collection of 'new releases'). In one embodiment of the invention, any of the graphics, texts blocks and/or navigation buttons can function as links (e.g., hyperlinks) to media content that is available for purchase at the online media store. Additionally, media store display panels 1501 can include one or more controls (e.g., 'Purchase' or 'Buy Now' buttons) to allow a user to purchase displayed media assets. Clearly, media store display panels 1501 can be implemented using various permutations and combinations of graphics, text blocks, and navigation buttons. Furthermore, the media store display panels 1501 can include dynamic elements as well as static elements. An example of a dynamic element in a media store display panel is a dynamic graphic (not shown) that changes periodically while cycling through a set of featured music artist graphics.

The portable electronic media store user-interface 1500 also includes a device control panel 1503. Device control panels 1503 can be used for displaying device controls, for example, a home button or a search button. The media store user-interface 1500 is only one configuration example; clearly other user-interface arrangements are possible.

Media store display panels 1501 come in a wide variety of types. FIGS. 15(*b*)-15(*d*) are illustrations of three possible media store display panels 1501.

FIG. 15(*b*) is a block diagram of an exemplary media store navigation display panel 1510 according to one embodiment of the invention. The media store navigation display panel 1510 is shown with three navigation buttons 1511. Navigation buttons 1511 are used to direct a user to media asset collections. Media asset collections can be any arbitrary grouping of media assets, such as music albums or collections put together for marketing purposes, for example top ten lists, genre groupings, or lists of new releases.

FIG. 15(*c*) is a block diagram of an exemplary featured artist display panel 1520, according to one embodiment of the invention. The featured artist display panel is shown with two featured artist graphics 1521. These featured artist graphics 1521 can be, for example, promotional graphics encouraging the purchase of a particular artist's music. Featured artist 1521 graphics can be selected (e.g., clicked on using a mouse or tapped on using a touch-sensitive screen) by a user to direct that user to a featured artist page. Other media categories media can be featured as well, for instance featured songs or featured albums.

FIG. 15(*d*) is a block diagram of an exemplary media browser display panel 1530 containing one or more graphics 1531, for example album cover art, and one or more text blocks 1533, for example music artist name or a music album title. The graphics 1531 and text blocks 1533 can be arranged in a wide variety of ways, for example in scrollable lists for browsing. Alternately, a small number of graphics 1531 and/or text blocks 1533 can be prominently grouped such that it is not necessary to scroll in order to see the entire group.

FIG. 15(*e*) is a block diagram of an exemplary device control panel 1540, according to one embodiment of the invention. The device control panel 1540 includes four device controls 1541. Device controls 1541 can include buttons or tabs that allow the user of the portable electronic media store user-interface 1500 to access the functionality of an online media store or the functionality of a portable electronic device upon which the portable media device user-interface 1500 is running. In one embodiment of the invention, the device controls 1541 include buttons that direct the user of the device to, for example, a search page, a top ten list, a featured music page, and a download queue. The number of controls 1541 in the device control panel can vary. For example, additional controls 1541 may appear in the device control panel 1540 when a network with additional functionality is available. For example, one or more additional controls 1541' may become available upon detecting a specific wireless network, such as a specific retail establishment's wireless network, that offers enhanced functionality and/or enhanced content.

FIG. 15(*f*) is a block diagram of an exemplary transition 1550 between a device control panel 1551 and a device control panel 1553 according to one embodiment of the invention.

In FIG. 15(*f*), the device control panel 1551 is displayed under normal circumstances, such as when a non-commercial public or home wireless network is detected. The device control panel 1551 can be similar to the device control panel 1541 of FIG. 15(*e*) above, for example. In one embodiment of the invention, the four device controls 1555 are shown, including device controls 1525 (e.g., buttons) that direct the user of the device to a search page, a top ten list, a featured music page, and a download page. In contrast, device control panel 1553 is displayed when a wireless network with enhanced functionality or enhanced content is detected. The device control panel 1553 has five device controls 1555. The additional device control 1555, designated 1555' in FIG. 15(*f*), appears after the transition 1550 between device control panel 1551 and device control panel 1555 and provides additional functionality that is available when an enhanced wireless network is detected.

In one embodiment of the invention, the additional device control 1555' functions as a link to enhanced online media store content associated with a retailer's local wireless network. In this embodiment, operating the additional device control 1513 causes an enhanced portable media device media store user-interface to load. In a second embodiment of the invention, the additional device control 1555' is a location-specific device control or an establishment specific device control that appears whenever location-specific or establishment-specific content and/or functionality are accessible.

FIG. 16(*a*) is a block diagram of an enhanced portable electronic media store user-interface 1600 according to one embodiment of the invention. The enhanced portable media device media store user-interface 1600 can replace or augment the portable media device media store user-interface 1500. In one embodiment of the invention, users can switch back and forth between the portable media device media store user-interface 1500 and the enhanced portable media device media store user-interface 1600 at will by operating one or more device controls.

The enhanced portable electronic media store user-interface 1600 can be used to access enhanced retailer-specific media store content. In one embodiment of the invention, the enhanced retailer-specific online media store content is featured in the enhanced portable media store user-interface 1600.

In FIG. 16(*a*), the portable electronic media store user-interface 1600 has three media store display panels 1601. Media store display panels 1601 can be used, for example, for displaying graphics, text blocks and/or navigation buttons that identify corresponding individual media assets or groups of media assets (e.g., a music album or a collection of 'new releases'). In one embodiment of the invention, any of the graphics, texts blocks and/or navigation buttons can function as links (e.g., hyperlinks) to media content that is available for purchase at the online media store. Additionally, media store display panels 1601 can include one or more controls (e.g., 'Purchase' or 'Buy Now' buttons) to allow a user to purchase displayed media assets. Clearly, media store display panels 1601 can be implemented using various permutations and combinations of graphics, text blocks, and navigation buttons. Furthermore, the media store display panels 1601 can include dynamic elements as well as static elements. An example of a dynamic element in a media store display panel is a dynamic graphic (not shown) that changes periodically while cycling through a set of featured music artist graphics.

Enhanced media store display panels 1601 come in a wide variety of types. Any of the media store display panels 1401 described above in reference to FIG. 14 and media store display panels 1501 described above in reference to FIG. 15 can be used in an enhanced media store display panel 1601. In addition FIGS. 16(*b*)-16(*d*) illustrate three other enhanced media store display panels 1601.

The enhanced portable electronic media store user-interface 1600 also includes a device control panel 1603. The device control panel 1603 can be used for displaying device controls, for example, a home button or a search button. The enhanced portable electronic media store user-interface 1600 is only one configuration example; clearly other user-interface arrangements are possible.

FIG. 16(*b*) is a block diagram of an exemplary 'Now Playing' display panel 1610, according to one embodiment of the invention. The 'Now Playing' display panel 1610 can contain location-specific information about whatever media asset is currently being presented to customers in a particular establishment.

For example, if a retail store (i.e., a retail establishment) uses a media-play system to present media content to its patrons (e.g., music or video) in the retail store for customers to see and/or hear, then any customer who wishes to know artist other information about the media content currently playing can access the 'Now Playing' display panel 1610 in the portable electronic media store user-interface 1600 in order to learn information about that media content. In one embodiment, the media items being played by the media play system and displayed on the 'Now Playing' display panel 1610 are media items that are also offered for sale using the enhanced portable electronic media store user-interface 1600.

In FIG. 16(*b*) the 'Now Playing' display panel 1610 contains a graphic 1611 (e.g., album cover art) and a text block 1613 associated with the currently playing media content. The text block 1613 can contain artist, album, and song title information about the media content currently playing in a specific establishment. Additionally, the 'Now Playing' display panel 1610 can contain a purchase control button 1615 (e.g., a 'Buy' button), which a customer can operate to purchase the displayed media asset.

FIG. 16(*c*) is a block diagram of an exemplary 'Recently Played Songs' display panel 1620, according to one embodiment of the invention. Much like the 'Now Playing' display panel 1610 of FIG. 16(*b*), the 'Recently Played Songs' display panel 1620 displays information including graphics 1621, for example album cover art, and one or more text blocks 1623, for example music artist name or a music album title, about media content that was presented before the currently playing media content. For example, if a retail store uses a media play system to present media content to its patrons (e.g., music or video) in the retail store for customers to see and/or hear, then any customer who wishes to know artist other information about the previously played media content can access the 'Recently Played Songs' display panel 1620 in the portable electronic media store user-interface 1600 in order to learn information about recently played songs (e.g., the last 10 songs or music videos played.) Additionally, the 'Recently Played Songs' display panel 1620 can contain a purchase control button 1625 (e.g., a 'Buy' button), which a customer can operate to purchase one or more of the displayed media assets.

FIG. 16(*d*) is a block diagram of an exemplary device control panel 1640, according to one embodiment of the invention. The device control panel 1640 shown includes five device controls 1641. Device controls 1641 can include buttons or tabs that allow the user of the enhanced portable electronic media store user-interface 1600 to access the functionality of an enhanced online media store or the functionality of the portable electronic device upon which the enhanced portable media device user-interface 1600 is operating. In one embodiment of the invention, the device controls 1641 include buttons that direct the user of the device to, for example, a search page, a top ten list, a featured music page, and a download page. The device controls 1641 can, for example, allow a user to utilize the functionality and features of the portable electronic media store user-interface 1500 as described above. Additionally, the device control panel includes one enhanced device control 1641', for example an enhanced online media store content home key, which can be used to direct a user to the enhanced portable electronic media store user-interface 1600 if the enhanced portable media store user-interface 1600 is not currently selected.

Figure 17:
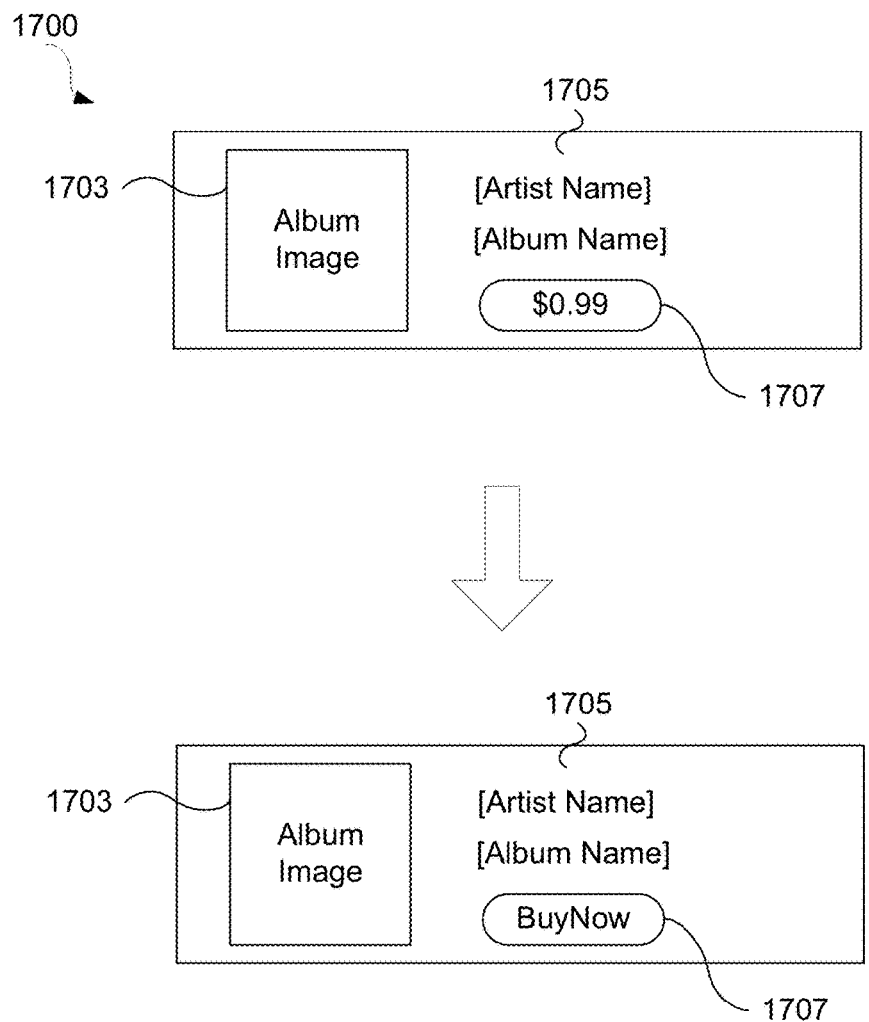
FIG. 17 is a portable media device media store purchase interface, according to one embodiment of the invention

FIG. 17 is a portable media device media store purchase interface 1700 according to one embodiment of the invention. The portable media device media store purchase interface 1700 can appear, for example, in any media store display panel 1401, 1501, or 1601 as described above in FIGS. 14, 15, and 16. Further, the portable media device media store purchase interface 1700 can display a single media asset for sale or a group of media assets in a scrollable list.

The portable media device media store purchase interface 1700 displays one or more media assets for sale. Media asset identifying information, which can include graphics 1703 and text 1705, are displayed. Additionally, the portable media device media store purchase interface 1700 includes at least one purchase control button 1707 (e.g., 'Buy' button.) In one embodiment of the invention, the purchase control button 1707 has two states, for example a purchase state and a purchase confirmation state. Depending on what state the purchase control button 1707 is in, the purchase control button has a different appearance.

In one embodiment of the invention, the purchase control button 1707 displays a purchase price for the associated one or more displayed media assets when it is in the purchase state. Once the purchase control button 1707 is operated, for example by clicking on the button with a mouse or tapping on the button using a touch screen, the purchase control button 1707 enters the purchase confirmation state. In one embodiment of the invention, when the purchase control button 1707 is in the purchase confirmation state, the purchase control button 1707 prompts the user for a confirmation that that user wants to purchase the one or more associated media assets, for example by displaying 'Buy Now' on the purchase control button 1707. In one embodiment of the invention, operating the purchase control button a second time places the one or more associated media assets in a download queue for immediate download to the user's portable media device.

Figure 18:
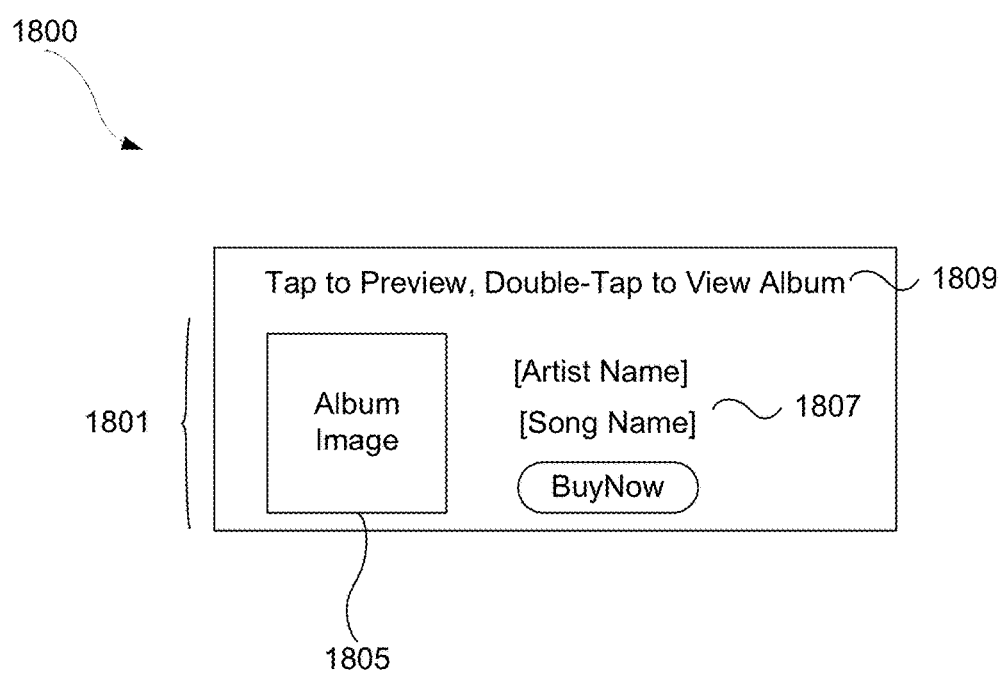
FIG. 18 is a portable media device media store browsing and previewing interface, according to one embodiment of the invention.

FIG. 18 is a portable media device media store browsing and previewing interface 1800 according to one embodiment of the invention. The portable media device media store browsing and previewing interface 1800 can appear, for example, in any media store display panel 1401, 1501, or 1601 as described above in FIGS. 14, 15, and 16. Further, the portable media device media store browsing and previewing interface 1800 can display a single media asset for browsing or previewing or a group of media assets in a scrollable list. Additionally, the portable media device media store browsing and previewing interface 1800 can be combined with the portable media device media store purchasing graphical user interface 1700 described in FIG. 17.

The portable media device media store browsing and previewing interface 1800 includes media asset information 1801, which can include graphics 1805 and text 1807. For example, graphics 1805 can be a representation of album cover art for a music album and text 1807 can be artist and song information associated with the graphic 1805. Additionally, the portable media device media store browsing and previewing interface 1800 provides instructions 1809 for how to operate the portable media device media store browsing and previewing interface 1800. When operating the portable media device media store browsing and previewing interface 1800, a user can click or tap on media asset information 1801 to see and/or hear a preview (i.e., a snippet of the larger media asset), of that media asset. Alternately, the user can double-click or double-tap on media asset information 1805 to receive additional information about that media asset, including for example, a track listing of an album associated with that media asset.

Figure 19:
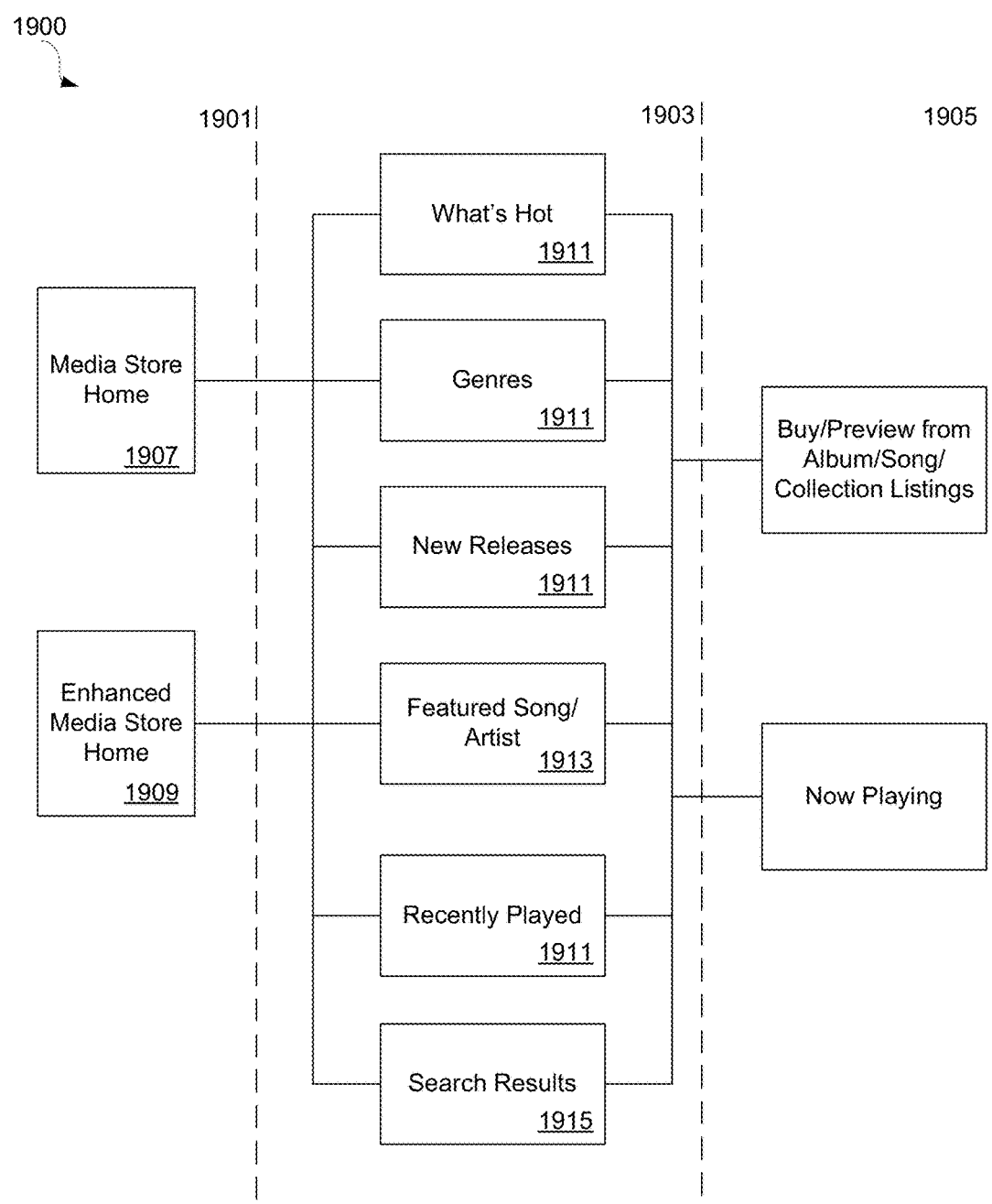
FIG. 19 is an exemplary portable media device graphical user interface tree, according to one embodiment of the invention.

FIG. 19 is an exemplary portable media device graphical user interface tree 1900 according to one embodiment of the invention. The components of the portable media device graphical user interface tree 1900 are accessed via device controls, for example the device controls 1441, 1541, and 1641, and via media store display panels 1440, 1540, and 1640 as described in FIGS. 14, 15, and 16. FIG. 19 illustrates three interface levels, designated home level interfaces 1901, browse level interfaces 1903, and preview/buy level interfaces 1905. Home level interfaces 1901 appear, for example, when an portable media device graphical user interface first starts (i.e., is launched) first starts or when a home key, for example a device control 1641 or 1641', described in FIG. 16, is pressed. Typically, home keys allow a user to start at the root of a interface tree. Two home level options 1901 are shown in FIG. 19: a media store home 1907 and an enhanced media store home 1909. The media store home 1907 is the interface displayed, for example, when the enhanced portable electronic media store graphical user interface 1600, described in FIG. 16, first starts. The enhanced media store home 1909 is available when enhanced media store content is available, for example as described above in FIG. 16. Next, a variety of browse level menus 1903 are shown. Browse level interfaces 1903 allow for browsing interactions, such as browsing through collections 1911, featured content 1913, or search results 1915 (for example, the results of a media store search based on search terms supplied by a user). Collections 1911 can be any collection of media assets, such as collections grouped by album, playlist, genre, popularity (e.g., "What's Hot"), novelty (e.g., "New Releases"), or other criteria, such as a collection of recently played songs, for example as in the 'Recently Played Songs' display panel 1620 of FIG. 16(*c*). Featured content 1913 is media content that is displayed prominently in a list or singly, for example the featured artist 1420, described in FIG. 14.

The preview/buy level interfaces 1905 include allow users to listen to samples of media content, and/or purchase media content. At this level, a user can interact with, for example, elements of the portable media device media store 'Two Click Buy' interface 1700 of FIG. 17, elements of the portable media device media store browsing and previewing interface 1800 of FIG. 18, or with the 'Now Playing' display panel 1610 of FIG. 16.

FIGS. 20-27 are screenshots of various permutations and combinations of display panels and device control panels like those generally described above in FIGS. 14-19. Specifically, the screenshots in FIGS. 20-27 are screenshots of iTunes™ media application, produced by Apple Inc. of Cupertino, Calif., operating on an iPhone™, also produced by Apple Inc. The location specific device controls in FIGS. 20-27 allow a user to interact with page(s), such as page(s) hosted by iTunes™ media store.

Figure 20:
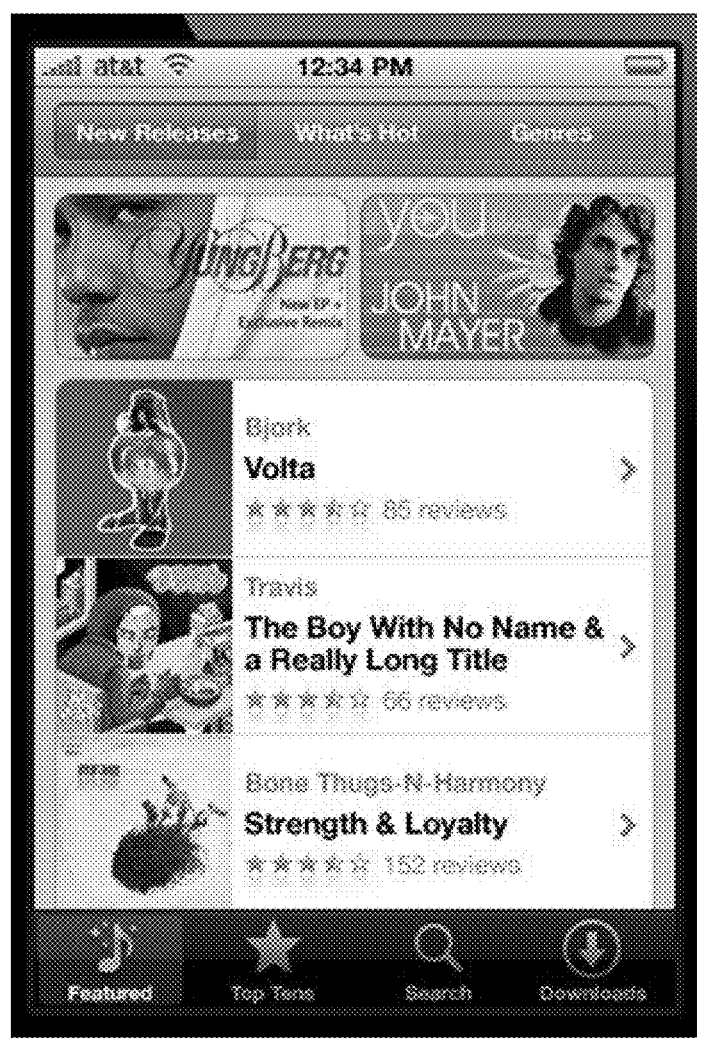
FIGS. 20-27 are screenshots of various specific combinations of display panels and device control panels.

FIG. 20 is a sample screenshot of an iTunes™ page running on an iPhone™, described generally in FIGS. 14(*a*)-14(*e*).

Figure 21:

FIG. 21 is a sample screenshot of an iTunes™ Starbucks™ media store page, including 'Now Playing' and 'Recently Played' panels, described generally in FIGS. 16(*a*)-16(*d*).

Figure 22:
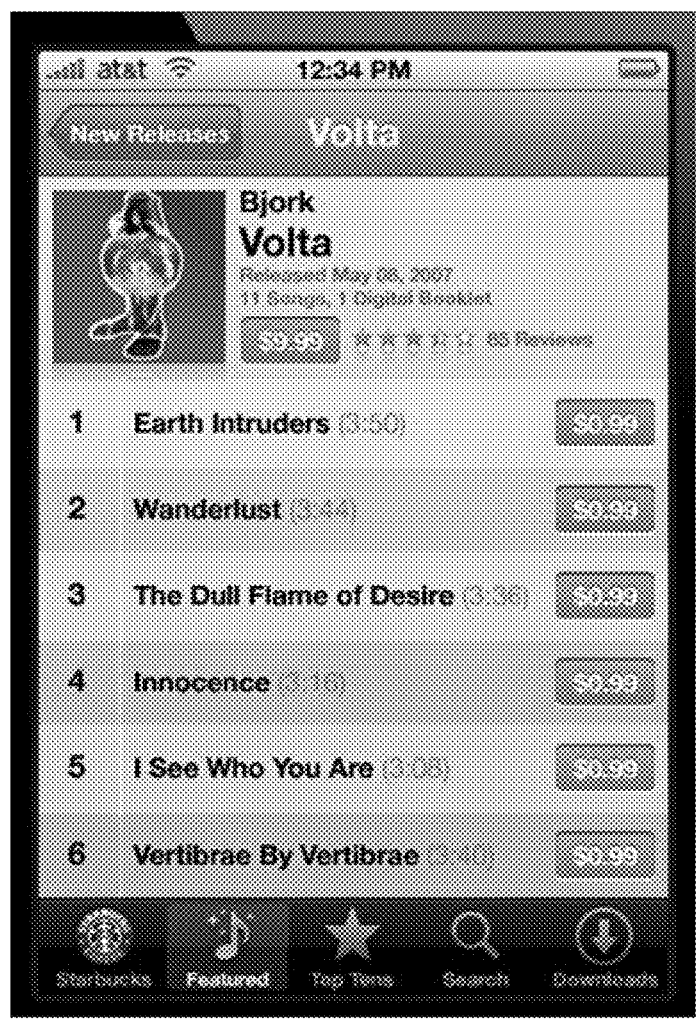

FIG. 22 is a sample screenshot of an iTunes™ page showing a Starbucks™ home key in the lower left corner of the display, which is an example of an enhanced device control 1641 as described above in FIG. 16(*d*).

Figure 23:
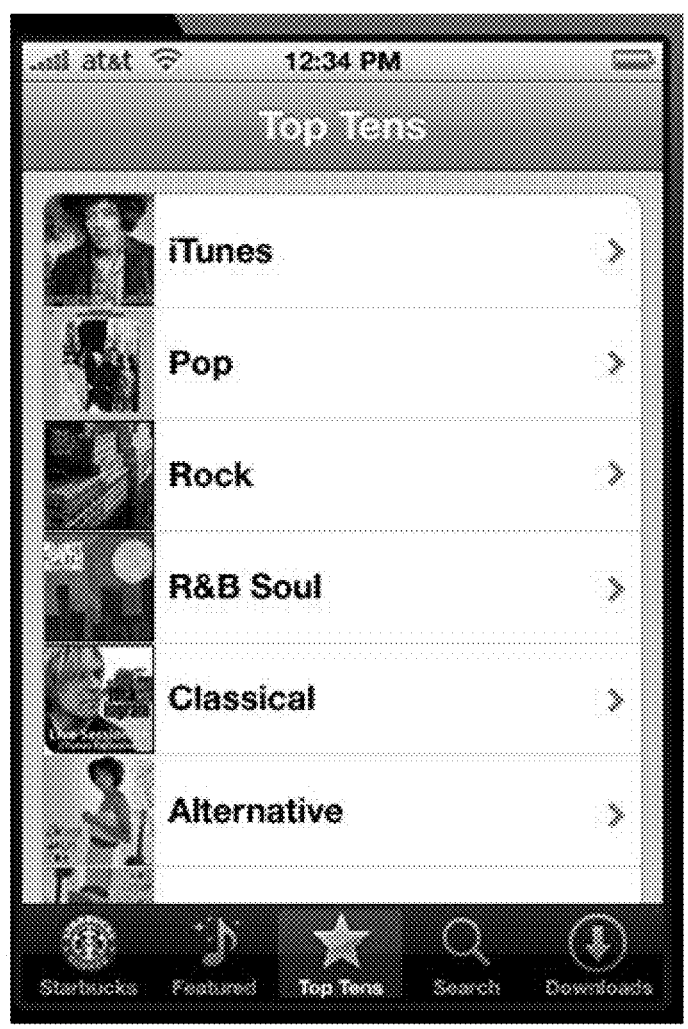

FIG. 23 is a sample screenshot of an iTunes™ page showing a list of media content collections.

Figure 24:

FIG. 24 is a sample screenshot of an iTunes™ search results page, displaying both artist and album results in a scrollable display panel.

Figure 25:

FIG. 25 is a sample screenshot of an iTunes™ download queue, described generally in FIG. 14.

Figure 26:

FIG. 26 is a sample screenshot of an error message in iTunes™ when a user attempts to access iTunes™ in an area that lacks a suitable network for iTunes™ to operate properly, described generally in FIG. 14.

Figure 27:

FIG. 27 is a sample screenshot of an iTunes™ media purchase interface, described generally in FIG. 17.

Retail locations or retail stores are, more generally, business locations or stores, respectively. Business locations or stores can also be referred to as establishments (or business establishments). One type of establishment is a retail establishment. Examples of establishments include coffee/tea shops, new stands, gyms, electronic stores, media stores, food service stores, sporting goods stores, bars, sporting venues, concert halls, etc. A group businesses that are closely proximate to one another can also share network resources so as to effectively offer the same advantages. For example, a shopping mall can support all its individual business tenants in the mall by providing the network access and storage equipment throughout the shopping mall to be shared by the various business tenants.

The portable electronic device utilized herein can, for example, correspond to a computing device (e.g., personal computer), mobile phone (e.g., cellular phone), personal digital assistant (PDA), media player (e.g., music, videos, games, images), media storage device, camera, and/or the like. The electronic device may also be a multi-functional device that combine two or more of these device functionalities into a single device. In one embodiment, the portable electronic device should support wireless communications so that the portable electronic device can wirelessly couple to a local area wireless network.

The portable electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

The portable electronic device utilized herein can, for example, correspond to a computing device (e.g., personal computer), mobile phone (e.g., cellular phone), personal digital assistant (PDA), media player (e.g., music, videos, games, images), media storage device, camera, remote control, and/or the like. The electronic device may also be a multi-functional device that combine two or more of these device functionalities into a single device. Examples of multi-functional devices can be found in U.S. Patent Application Publication No. 20060197753, entitled "MULTI-FUNCTIONAL HAND-HELD DEVICE", which is herein incorporated by reference.

Figure 28:
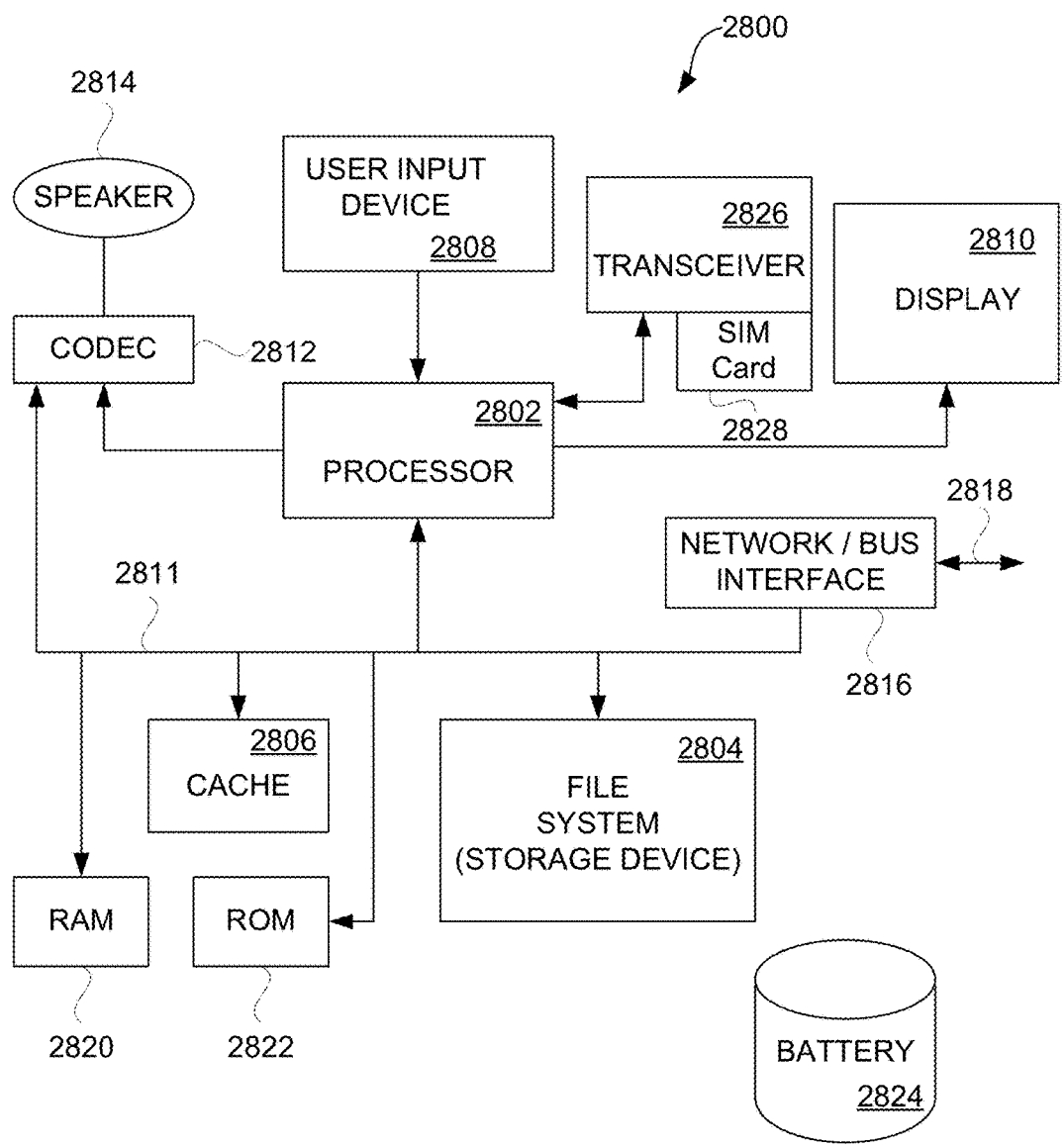
FIG. 28 is a block diagram of a mobile multi-function device according to one embodiment of the invention.

FIG. 28 is a block diagram of a mobile multi-function device 2800 according to one embodiment of the invention. The mobile multi-function device 2800 can include the circuitry of a portable electronic device that can perform the operations described above. The mobile multi-function device 2800 includes hardware and software components to provide at least two functions, namely, a media playback function (including display screen/menu presentations) and a wireless voice communications function. When providing media playback, the mobile multi-function device 2800 can operate as a media player capable of playing (including displaying) media items. The media items can, for example, pertain to audio items (e.g., audio files or songs), videos (e.g., movies) or images (e.g., photos). When providing wireless voice communications, the mobile multi-function device 2800 can operate as a mobile telephone (e.g., cellular phone).

The mobile multi-function device 2800 includes a processor 2802 that pertains to a microprocessor or controller for controlling the overall operation of the mobile multi-function device 2800. The mobile multi-function device 2800 stores media data pertaining to media items in a file system 2804 and a cache 2806. In one embodiment, the file system 2804 is implemented by a storage disk or a plurality of disks. In another embodiment, the file system 2804 is implemented by EEPROM or Flash type memory. The file system 2804 typically provides high capacity storage capability for the mobile multi-function device 2800. However, because the access time to the file system 2804 can be relatively slow, the mobile multi-function device 2800 can also include a cache 2806. The cache 2806 is, for example, Random-Access Memory (RAM) provided by semiconductor memory. The relative access time to the cache 2806 is substantially shorter than for the file system 2804. However, the cache 2806 does not have the large storage capacity of the file system 2804. Further, the file system 2804, when active, consumes more power than does the cache 2806. The power consumption is often a concern when the mobile multi-function device 2800 is a portable mobile multi-function device that is powered by a battery 2824. The mobile multi-function device 2800 also includes a RAM 2820 and a Read-Only Memory (ROM) 2822. The ROM 2822 can store programs, utilities or processes to be executed in a non-volatile manner. The ROM 2822 can be implemented by an EEPROM or Flash type memory so as to provide writable non-volatile data storage. The RAM 2820 provides volatile data storage, such as for the cache 2806.

In one embodiment, to support wireless voice communications, the mobile multi-function device 2800 includes a transceiver 2826 and a SIM card 2828. The transceiver 2826 supports wireless communication with a wireless network (such as a wireless cellular network). The SIM card 2828 includes an identifier (e.g., SIM identifier) can be used by the mobile multi-function device 2800 to gain access and utilize the wireless network. In other embodiments, a SIM card 2828 is not utilized.

The mobile multi-function device 2800 also includes a user input device 2808 that allows a user of the mobile multi-function device 2800 to interact with the mobile multi-function device 2800. For example, the user input device 2808 can take a variety of forms, such as a button, keypad, dial, etc. Still further, the mobile multi-function device 2800 includes a display 2810 (screen display) that can be controlled by the processor 2802 to display information to the user. A data bus 2811 can facilitate data transfer between at least the file system 2804, the cache 2806, the processor 2802, and the CODEC 2812.

In one embodiment, the mobile multi-function device 2800 serves to store a plurality of media items (e.g., songs) in the file system 2804. When a user desires to have the mobile multi-function device play a particular media item, a list of available media items is displayed on the display 2810. Then, using the user input device 2808, a user can select one of the available media items. The processor 2802, upon receiving a selection of a particular media item, supplies the media data (e.g., audio file) for the particular media item to a coder/decoder (CODEC) 2812. The CODEC 2812 then produces analog output signals for a speaker 2814. The speaker 2814 can be a speaker internal to the mobile multi-function device 2800 or external to the mobile multi-function device 2800. For example, headphones or earphones that connect to the mobile multi-function device 2800 would be considered an external speaker.

The mobile multi-function device 2800 also includes a bus interface 2816 that couples to a data link 2818. The data link 2818 allows the mobile multi-function device 2800 to couple to a host device (e.g., host computer or power source). The data link 2818 can also provide power to the mobile multi-function device 2800.

The portable electronic device utilized herein can further be a hand-held electronic device. The term hand-held generally means that the electronic device has a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

The digital media assets (i.e., digital media items) can pertain to video items (e.g., video files or movies), audio items (e.g., audio files or audio tracks, such as for songs (music) or audiobooks), or image items (e.g., photos). The digital media assets can also include or be supplemented by text or multimedia files.

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that patrons of establishments can dynamically receive store-based information while at the establishments. The store-based information can facilitates user experience at the establishment. The store-based information can also facilitate locating associated media content from an online media store. Another advantage of the invention is that store-based information can be displayed on a patron's portable electronic device while the patron is at an establishment. Still another advantage of the invention is that a media content provider, such as an online media store, can coordinate with central management for various establishments so store-based information can be centrally stored and accessible. Yet still another advantage of the invention is that improved graphical user interfaces can be provided to patrons of establishments.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for presenting customized data to a patron of an establishment, the patron operating a portable electronic device at the establishment and having wireless network access via a wireless network, said method comprising:
   determining whether the portable electronic device associated with the patron is located at a predetermined establishment;
   sending a data request from the portable electronic device associated with the patron located at the predetermined establishment to a remote data server apparatus;
   receiving, at the portable electronic device, a data response from the remote data server apparatus via at least the wireless network, wherein the data response includes or references establishment-based information pertaining to the predetermined establishment; and
   simultaneously displaying, at the portable electronic device, the establishment-based information and information previously presented on the display, wherein at least a portion of the data being requested by the data request is dependent on whether the patron is determined to be located at the predetermined establishment, wherein the establishment-based information includes at least information on at least one media item being played or recently played by a media play system at the predetermined establishment, wherein the displaying displays at least one purchase control that enables a user to initiate purchase of one or more of the media items being identified by the establishment-based information, wherein the data request is a request to an online media store for an online store media page, and wherein the data response includes information on one or more media items available for purchase from the online media store, and wherein said transmitting comprises:
forming a page responsive to the data request; and
augmenting the page to include the store-based information when the patron is determined to be located at the store.

2. A method as recited in claim 1, wherein at least a portion of the data being requested by the data request is dependent on the predetermined establishment.

3. A method as recited in claim 2, wherein the data request includes or is associated with a establishment identifier for the predetermined establishment.

4. A method as recited in claim 1, wherein the one or more purchase controls being displayed are links that, on selection, access an online store media data page where purchase of the associated media item can be concluded.

5. A method for provide customized information to patrons of a store, said method comprising:
receiving, at a server apparatus, a data request initiated from a requesting electronic device associated with a patron located at a store;
determining, at the server apparatus, whether the patron is located at the store;
generating a data response including or referencing store-based information pertaining to the store if it is determined that the patron is located at the store;
customizing the data response by the server apparatus to include or reference the store-based information and information previously displayed on the requesting electronic device;
transmitting the customized data response from the server apparatus to the requesting electronic device for simultaneous display of the store-based information and information previously displayed on the requesting electronic devices wherein the store-based information includes media playing information of a media item currently playing at the store or a list of media items recently played at the store,
wherein, on display of the store-based information, at least one purchase control is displayed, the at least one purchase control enables a user to initiate purchase of the media item currently playing or one or more of the media items in the list of media items recently played,
wherein the data request is a request to an online media store for an online store media page, and wherein the data response includes information on one or more media items available for purchase from the online media store, and
wherein said transmitting comprises:
forming a page responsive to the data request; and
augmenting the page to include the store-based information when the patron is determined to be located at the store.

6. A method as recited in claim 5, wherein a media play system is also provided at the store to play media items at the store.

7. A method as recited in claim 6, wherein the at least one purchase control being displayed is a link that, on selection, accesses an online store media data page where purchase of the associated media item can be concluded.

8. A method as recited in claim 5, wherein said determining of whether the patron is located at the store comprises examining the data request to determine whether the patron is located at the store.

9. A method as recited in claim 5, wherein said determining of whether the patron is located at the store comprises determining whether the data request includes or references a particular store identifier for the store.

10. A portable electronic device, comprising:
a display;
wireless communication circuitry; and
a processor configured to:
determine whether the portable electronic device is located at an establishment;
display information concerning the establishment on a first portion of the display when the portable electronic device is located at the establishment; and
display information previously displayed on the portable electronic device on a second portion of the display when the portable electronic device is located at the establishment,
wherein the information concerning the establishment includes at least information on at least one media item being played or recently played by a media play system at the establishment,
wherein the display of the information concerning the establishment further includes display of at least one purchase control that enables a user to initiate purchase of the at least one media item being identified by the information concerning the establishment,
wherein the data request is a request to an online media store for an online store media page, and wherein the data response includes information on one or more media items available for purchase from the online media store, and
wherein said transmitting comprises:
forming a page responsive to the data request; and
augmenting the page to include the store-based information when the patron is determined to be located at the store.

11. A portable electronic device as recited in claim 10, wherein the portable electronic device is configured to operate in a first mode when not located at an establishment and is configured to operate in a second mode when located in an establishment.

12. A portable electronic device as recited in claim 11, wherein in the second mode the display is configured to present information concerning the establishment and wherein in the first mode the display does not present information concerning the establishment.

13. A portable electronic device as recited in claim 10, wherein the portable electronic device is configured to receive the information concerning the establishment via the wireless communication circuitry.

14. A portable electronic device as recited in claim 10, wherein when the information concerning the establishment is displayed, one or more purchase controls are displayed that serve as buy buttons that, on selection, access an online store media data page where purchase of the associated media item can be concluded.

\* \* \* \* \*